US006900938B2

(12) United States Patent
Zhao

(10) Patent No.: US 6,900,938 B2
(45) Date of Patent: May 31, 2005

(54) LOW DISPERSION INTERLEAVER

(76) Inventor: Bin Zhao, 14 Figaro, Irvine, CA (US) 92606

( * ) Notice: Subject to any disclaimer, the term of this patent is extended or adjusted under 35 U.S.C. 154(b) by 217 days.

(21) Appl. No.: 10/016,812

(22) Filed: Nov. 30, 2001

(65) Prior Publication Data
US 2003/0007248 A1 Jan. 9, 2003

Related U.S. Application Data

(63) Continuation-in-part of application No. 09/891,795, filed on Jun. 25, 2001.

(51) Int. Cl.[7] .................................................. G02B 5/30
(52) U.S. Cl. ....................... 359/494; 359/495; 359/496; 359/497; 359/498
(58) Field of Search ................................. 359/498, 494, 359/495, 496, 497, 124

(56) References Cited

U.S. PATENT DOCUMENTS

| 4,247,166 | A |   | 1/1981  | Yeh            |
|-----------|---|---|---------|----------------|
| 4,500,178 | A |   | 2/1985  | Yeh            |
| 4,531,197 | A |   | 7/1985  | Lin            |
| 4,548,479 | A |   | 10/1985 | Yeh            |
| 4,685,773 | A |   | 8/1987  | Carlsen et al. |
| 5,013,140 | A |   | 5/1991  | Healey et al.  |
| 5,062,694 | A |   | 11/1991 | Blair          |
| 5,347,378 | A |   | 9/1994  | Handschy       |
| 5,414,540 | A |   | 5/1995  | Patel et al.   |
| 5,414,541 | A |   | 5/1995  | Patel et al.   |
| 5,471,340 | A |   | 11/1995 | Cheng et al.   |
| 5,574,596 | A |   | 11/1996 | Cheng          |
| 5,606,439 | A |   | 2/1997  | Wu             |
| 5,682,446 | A |   | 10/1997 | Pan et al.     |
| 5,694,233 | A |   | 12/1997 | Wu et al.      |
| 5,724,165 | A |   | 3/1998  | Wu             |
| 5,771,120 | A |   | 6/1998  | Bergmann       |
| 5,774,264 | A |   | 6/1998  | Konno et al.   |
| 5,818,981 | A |   | 10/1998 | Pan et al.     |
| 5,867,291 | A |   | 2/1999  | Wu et al.      |
| 5,978,116 | A |   | 11/1999 | Wu et al.      |
| 6,005,697 | A |   | 12/1999 | Wu et al.      |
| 6,049,427 | A |   | 4/2000  | Bettman        |
| 6,134,031 | A |   | 10/2000 | Nishi et al.   |
| RE37,044  | E |   | 2/2001  | Wu             |
| 6,208,442 | B1|   | 3/2001  | Liu et al.     |
| 6,222,958 | B1|   | 4/2001  | Paiam          |
| 6,256,433 | B1|   | 7/2001  | Luo et al.     |
| 6,335,830 | B1| * | 1/2002  | Chang et al. ................ 359/498 |
| 6,417,944 | B1| * | 7/2002  | Lahat et al. ................. 359/124 |

OTHER PUBLICATIONS

Pages 10–29 from book believed to be entitled *Electromagnetic Theory*. No further information on book is available.
Carl F. Buhrer; *Synthesis and tuning of high–order Solc–type birefringent filters,* Applied Optics, Apr. 20, 1994, vol. 33, No. 12, pp. 2249–2254.

(Continued)

Primary Examiner—Audrey Chang
Assistant Examiner—Craig Curtis

(57) ABSTRACT

An apparatus for channel interleaving comprises a spatial birefringent device assembly and a reflector which is configured so as to direct light from the spatial birefringent device assembly back through the spatial birefringent device assembly. The spatial birefringent device assembly comprises at least one spatial birefringent device. Directing light from the spatial birefringent device assembly back through the spatial birefringent device assembly substantially mitigates cross-talk and/or dispersion of the apparatus for channel interleaving in communications.

15 Claims, 12 Drawing Sheets

OTHER PUBLICATIONS

Tatsuya A Kimura, Masatoshi Saruwatari; *Temperature Compensation of Birefringent Optical Filters; Proceeding Letters*, Aug. 1971, pp. 1273–1274.

Carl F. Buhrer; *Four waveplate dual tuner for birefringent filters and multiplexers: Applied Optics*, Sep. 1, 1987, vol. 26, No. 17, pp. 3628–3632.

P. Melman, W. J. Carlsen, B. Foley; *Tunable Birefringent Wavelength–Division Multiplexer/Demultiplexer, Electronics Letters*, Jul. 18, 1985, vol. 21, No. 15, pp. 634 and 635.

Yohji Fujii, *Tunable wavelength multi/demultiplexer using a variable retardation phase plate; Applied Optics*, Aug. 20, 1990, vol. 29, No. 29.

S.E. Harris, E.O. Ammann, I. C. Chang; *Optical Network Synthesis Using Birefringent Crystals.\* I. Synthesis of Loss less Networks of Equal–Length Crystals, Journal of the Optical Society of America*, Oct. 1964, vol. 564, NO. 10, pp. 1267–1279.

Tatsuya Kimura, Masatoshi Saruwatari, and Kenju Otsuka; *Birefringent Branching Filters for Wideband Optical FDM Communications; Applied Optics*, Feb. 1973, vol. 12, No. 2, pp. 373 to 379.

Godfrey R. Hill; *Wavelength Domain Optical Network Techniques; Proceedings of the IEEE*, Jan. 1989, vol. 77, No. 1, pp. 121 to 132.

J. M. Senrio, S.D. Cusworth; *Devices for Wavelength Multiplexing and Demultiplexing; IEE Proceedings*, Jun. 1989, vol. 136, Pt. J. No. 3, pp. 183–202.

\* cited by examiner

LOW DISPERSION INTERLEAVER

CROSS-REFERENCE TO RELATED APPLICATIONS

This patent application is a continuation in part patent application of U.S. patent application Ser. No. 09/891,795, filed on Jun. 25, 2001, and entitled APPARATUS FOR CHANNEL INTERLEAVING IN COMMUNICATIONS, the entire contents of which are hereby expressly incorporated by reference.

FIELD OF THE INVENTION

The present invention relates generally to optical devices and relates more particularly to an interleaver for optical communications and the like.

BACKGROUND OF THE INVENTION

According to wavelength-division multiplexing (WDM) and dense wavelength-division multiplexing (DWDM), a plurality of different wavelengths of light are transmitted via a single medium such as an optical fiber. Each wavelength corresponds to a separate channel and carries information generally independently with respect to the other channels. The plurality of wavelengths (and consequently the corresponding plurality of channels) are transmitted simultaneously without interference with one another, so as to substantially enhance the transmission bandwidth of the communication system. Thus, a much greater amount of information can be transmitted than is possible utilizing a single wavelength optical communication system.

The individual channels of a wavelength-division multiplexed or dense wavelength-division multiplexed signal must be selected or separated from one another at a receiver in order to facilitate detection and demodulation thereof. This separation or demultiplexing process can be performed or assisted by an interleaver. A similar device facilitates multiplexing of the individual channels by a transmitter.

Modern dense wavelength-division multiplexed (DWDM) optical communications and the like require that network systems offer an ever-increasing number of channel counts, thus mandating the use of a narrower channel spacing in order to accommodate the increasing number of channel counts. The optical interleaver, which multiplexes and demultiplexes optical channels with respect to the physical media, i.e., optical fiber, offers a potential upgrade path, so as to facilitate scalability in both channel spacing and number of channel counts in a manner which enhances the performance of optical communication networks.

As a multiplexer, an interleaver can combine two streams of optical signals, wherein one stream contains odd channels and the other stream contains even channels, into a single, more densely spaced optical signal stream. As a demultiplexer, an interleaver can separate a dense signal stream into two, wider spaced streams, wherein one stream contains the odd channels and the other stream contains the even channels. Thus, the interleaver offers scalability which allows contemporary communication technologies that perform well at wider channel spacing to address narrower, more bandwidth efficient, channel spacings.

It is important that the interleaver separate the individual channels sufficiently so as to mitigate undesirable crosstalk therebetween. Crosstalk occurs when channels overlap, i.e., remain substantially unseparated, such that some portion of one or more non-selected channels remains in combination with a selected channel. As those skilled in the art will appreciate, such crosstalk interferes with the detection and/or demodulation process. Generally, the effects of crosstalk must be compensated for by undesirably increasing channel spacing and/or reducing the communication speed, so as to facilitate reliable detection/demodulation of the signal.

However, as channel usage inherently increases over time, the need for efficient utilization of available bandwidth becomes more important. Therefore, it is highly undesirable to increase channel spacing and/or to reduce communication speed in order to compensate for the effects of crosstalk. Moreover, it is generally desirable to decrease channel spacing and to increase communication speed so as to facilitate the communication of a greater quantity of information utilizing a given bandwidth.

Since it is generally impractical and undesirably expensive to provide precise control during manufacturing, the actual wavelength of communication channels and the center wavelength of filters generally tend to mismatch with each other. Precise control of manufacturing processes is difficult because it involves the use of more stringent tolerances which inherently require more accurate manufacturing equipment and more time consuming procedures. The actual wavelength of the communication channel and the center wavelength of the filter also tend to drift over time due to inevitable material and device degradation over time and also due to changes in the optical characteristics of optical components due to temperature changes. Therefore, it is important that the passband be wide enough so as to include a selected signal, even when both the carrier wavelength of the selected signal and the center wavelength of the passband are not precisely matched or aligned during manufacturing and have drifted substantially over time.

Although having a wider filter passband is generally desirable, so as to facilitate the filtering of signals which have drifted somewhat from their nominal center wavelength, the use of such wider pass bands and the consequent accommodation of channel center wavelength drift does introduce the possibility for undesirably large dispersion being introduced into a filtered channel. Typically, the dispersion introduced by a birefringent filter or interleaver increases rapidly as the channel spacing is reduced and as a channel moves away from its nominal center wavelength, as discussed in detail below. Thus, as more channel wavelength error is tolerated in a birefringent filter or interleaver, greater dispersion valves are likely to be introduced.

As those skilled in the art will appreciate, dispersion is the non-linear phase response of an optical device or system wherein light of different wavelengths is spread or dispersed, such that the phase relationship among the different wavelengths varies undesirably as the light passes through the device or system. Such dispersion undesirably distorts optical signals, such as those used in optical communication systems.

Contemporary interleavers have dispersion versus wavelength curves which have zero dispersion value at a particular wavelength, such as at nominal channel center wavelength. The dispersion versus wavelength curve of such contemporary interleavers departs drastically from this zero dispersion value as the wavelength moves away from the nominal channel center wavelength. Thus, small deviations in channel center wavelength can result in undesirably large dispersion values being realized.

Since, as discussed in detail above, it is extremely difficult, if not impossible, to maintain the actual channel wavelength precisely at its nominal value, such channel center wavelengths do vary, thereby resulting in undesirably large dispersion values.

As channel spacing is decreased continuously for larger channel count over a given bandwidth, significant and undesirable dispersion appears and can dramatically degrade optical signal quality, particularly in high bit rate optical communication systems.

There are four basic types of interleavers suitable for multiplexing and demultiplexing optical signals. These include birefringent filters, thin-film dielectric devices, planar waveguides, and fiber-based devices. All of these contemporary interleaving technologies suffer from substantial limitations with respect to channel spacing, dispersion, insertion loss, channel isolation, temperature stability, cost, reliability and flexibility.

Birefringent crystals are commonly used in birefringent filters for separating multiplexed optical channels in DWDM communication systems. Birefringent crystals are materials in which the phase velocity of an optical beam propagating therein depends upon the polarization direction of the optical beam. However, birefringent crystals suffer from inherent limitations which seriously degrade their performance, limit their application and reduce their desirability. Contemporary crystal birefringent devices suffer from limitations imposed by the crystal's physical, mechanical and optical properties, as well as by problems associated with temperature instability. Further, such contemporary crystal birefringent devices have comparatively small and fixed birefringent values. The crystals utilized in such contemporary crystal birefringent devices are comparatively high in cost, both with regard to the synthesis thereof and with regard to their use in fabrication of optical devices, e.g., interleavers as discussed above.

Thus, there is a need to provide an optical interleaver which can overcome or mitigate at least some of the above-mentioned limitations.

SUMMARY OF THE INVENTION

The present inventions specifically addresses and alleviates the above-mentioned deficiencies associated with the prior art. More particularly, the present invention comprises an interleaver comprising a birefringent device assembly and a reflector configured so as to direct light from the birefringent device assembly back through the birefringent device assembly. The birefringent device assembly comprises at least one spatial birefringent device. Such spatial birefringent device utilizes a difference in optical path length caused by a difference in physical path lengths or a difference in refraction indices along different paths, rather than utilizing birefringent crystals.

Directing light from the birefringent device assembly back into and through the birefringent device assembly substantially mitigates crosstalk and/or dispersion. By mitigating crosstalk and dispersion, interleavers having narrower channel spacings may be constructed. As discussed above, narrower interleaver channel spacing facilitates enhanced bandwidth utilization and an desirably increased number of channel counts.

It is understood that changes in the specific structure shown and described may be made within the scope of the claims without departing from the spirit of the invention.

BRIEF DESCRIPTION OF THE DRAWINGS

These, and other features, aspects and advantages of the present invention will be more fully understood when considered with respect to the following detailed description, appended claims and accompanying drawings, wherein:

DETAILED DESCRIPTION OF THE INVENTION

Figure 1:
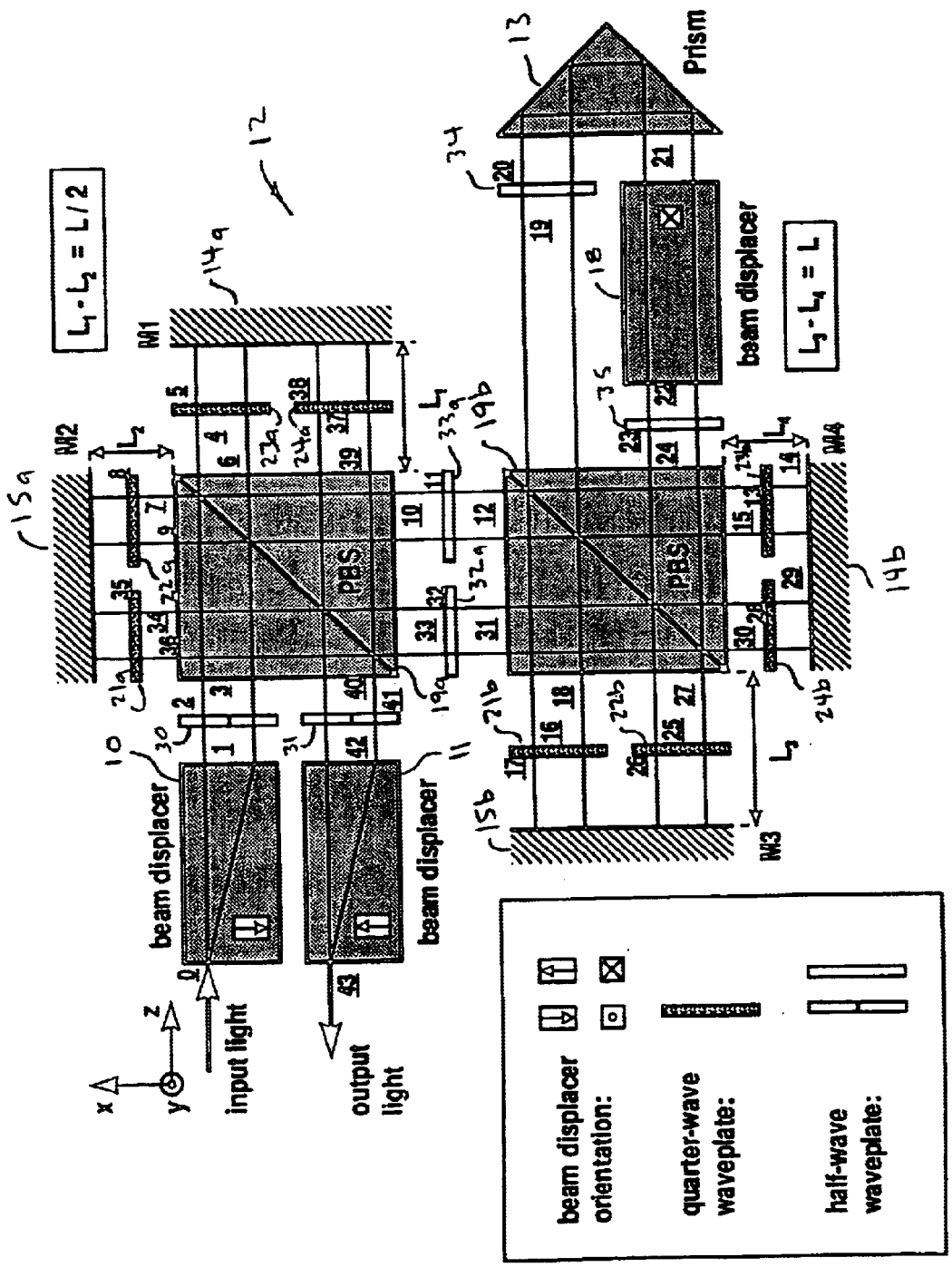
FIG. 1 is a top view schematic diagram of a two-element fold interleaver constructed according to the present invention.

The detailed description set forth below in connection with the appended drawings is intended as a description of the presently preferred embodiment of the invention and is not intended to represent the only form in which the present invention may be constructed or utilized. The description sets forth the functions of the invention and the sequence of steps for constructing and operating the invention in connection with the illustrated embodiment. It is to be understood, however, that the same or equivalent functions and sequences may be accomplished by different embodiments that are also intended to be encompassed with the spirit and scope of the invention.

The description contained herein is directed primarily to the configuration of an interleaver as a demultiplexer. However, as those skilled in the art will appreciate, the present invention may be used in both demultiplexers and multiplexers. The difference between demultiplexers and multiplexers is small and the configuration of the present invention as either desired device is well within the ability of one of the ordinary skill in the art.

Two different reference systems are used in this patent application for the determination of angular orientations. One reference system is used for the determination of the equivalent angular orientations of spatial birefringent devices, with respect to an equivalent polarization direction of input light. Another reference system is used for the determination of the angular orientations of waveplates with respect to a moving (x, y, z) coordinate system. Thus, when reading the detailed description below, it will be very helpful to understand these two reference systems. Thus, when reading the detailed description below, it will be very helpful to understand these two reference systems.

When the equivalent angular orientation of a birefringent element is discussed, the angular orientation is typically the fast axis of the birefringent element with respect to the polarization direction of incoming light just prior to the incoming light reaching the birefringent element. Determination of the angular orientation is made by observing oncoming light with the convention that the angle is positive if the rotation of the fast axis is clockwise with respect to the polarization direction of the incoming light and is negative if the rotation is counter-clockwise with respect to the polarization direction of the oncoming light.

If there is a series of spatial birefringent devices, such as in a birefringent filter, the equivalent angular orientations of each of the devices of the filter are measured by their fast axes with respect to an equivalent polarization direction of incoming light just prior to the incoming light reaching the first birefringent device of the filter. If there are more than one birefringent filters in a sequence, then the equivalent angular orientations are determined separately for each birefringent filter (the equivalent angular orientations are measured with respect to an corresponding equivalent polarization direction of incoming light just prior to the incoming light reaching the first birefringent device of each different filter). Thus, each birefringent filter has its own independent reference for the determination of the angular orientations of the birefringent devices thereof. Each spatial birefringent device has its own equivalent polarization direction of incoming light just prior to the incoming light reaching the first birefringent device.

The angular orientations of waveplates are measured by the optic axes of waveplates with respect to the +x axis. However, it is very important to appreciate that the +x axis is part of the moving coordinate system. This coordinate system travels with the light, such that the light is always traveling in the +z direction and such that the +y axis is always up as shown in the drawings. Thus, when the light changes direction, the coordinate system rotates with the +y axis thereof so as to provide a new coordinate system. The use of such a moving coordinate system allows the optical beam states, the birefringent elements, and the waveplates to be viewed in a consistent manner at various locations in the devices, i.e., always looking into the light, and therefore substantially simplifies viewing and analysis of the devices.

Determination of the angular orientations in (x, y, z) coordinate system is made by observing oncoming light with the convention that the angle is positive if the rotation of the corresponding optical axis is counter-clockwise with respect to +x axis and is negative if the rotation is clockwise with respect to the +x axis (which is consistent with the conventional use of (x, y, z) coordinate system, but which is contrary to the sign convention for determining the angular orientations of birefringent elements with respect to the input polarization direction, as discussed above).

The present invention comprises an interleaver which comprises a birefringent device assembly. The birefringent device assembly comprises at least one spatial birefringent device. A reflector is configured so as to direct light which is emitted from the birefringent device assembly back into and through the birefringent device assembly, such that the light travels through the birefringent device assembly in two different, generally opposite directions. The birefringent device assembly provides two output components of the light input thereto. One output component corresponds to the interleaved odd channels and the other corresponds to the interleaved even channels. The reflector is configured to direct the two components back through the birefringent device assembly. By transmitting the light through the birefringent element assembly in both directions, crosstalk can be substantially mitigated. Further, dispersion can be substantially mitigated or eliminated.

Directing light from the birefringent device assembly back into and through the birefringent device assembly is achieved by use of an optical reflector. The reflector preferably comprises a single prism. However, those skilled in the art will appreciate that the reflector may attentively comprise more than one prism and/or one or more mirrors or etalons.

The birefringent device assembly may contain any desired number of spatial birefringent devices. For example, the birefringent device assembly may contain one, two, three, four, five or more spatial birefringent devices. As those skilled in the art will appreciate, additional birefringent devices tend to enhance the transmission vs. wavelength curve of the birefringent filter or interleaver defined by the birefringent devices, so as to tend to provide a flatter and wider passband and/or so as to provide a deeper and wider stopband.

According to one preferred embodiment of the present invention, the birefringent device assembly is disposed intermediate (in an optical sense) an input polarization beam displacer and an intermediate polarization beam displacer.

The birefringent device assembly comprises at least one spatial birefringent device. The spatial birefringent device physically separate two orthogonally polarized optical beams and provides differences in physical path lengths and/or refraction indices for the two optical beams so as to provide a birefringent effect. In this manner, the use of birefringent crystals and disadvantages commonly associated therewith are eliminated According to one preferred embodiment of the present invention, the interleaver comprises an input polarization beam displacer from which light is transmitted to the birefringent device assembly; a first input half-wave waveplate assembly configured to receive light from the input polarization beam displacer and control the light polarization directions; an intermediate polarization beam displacer configured to transmit light from the birefringent device assembly before the light is transmitted back through the birefringent device assembly; a second input half-wave waveplate assembly configured to control the light polarization directions before the light is transmitted back through the birefringent device assembly; an output half-wave waveplate assembly configured to control the light polarization directions after the light is transmitted back through the birefringent device assembly; and an output polarization beam displacer to which light is transmitted after the light has been transmitted back through the birefringent device assembly.

The spatial birefringent device preferably comprises a polarization beam splitter (which separates an optical beam into two orthogonally polarized optical components); a first mirror; a second mirror; first quarter-wave waveplate(s) having an optic axis thereof oriented at an angle of approximately 45° with respect to the +x axis at that location, the first quarter-wave waveplate(s) being disposed intermediate the polarization beam splitter and the first mirror; second quarter-wave waveplate(s) having an optic axis thereof oriented at an angle of approximately 45° with respect to the +x axis at that location, the second quarter-wave waveplate (s) being disposed intermediate the polarization beam splitter and the second mirror.

According to the present invention, a birefringent effect is obtained by defining a first and a second light paths at each birefringent device, wherein light input into the birefringent device is split into two composite beams, each of the two composite beams travels along separate paths. The two paths have different optical path lengths, such that when the two beams recombine a birefringent effect is achieved. Preferably, the splitting of light into two components and the recombining of the two components are achieved utilizing a polarization beam splitter. Those skilled in the art will appreciate that various other devices for separating and recombining light (such as polarization beam displacers) are likewise suitable. Reflectors, such as mirrors, or prisms, can be used to define the two paths. Generally, each path will be from a polarization beam splitter to a mirror or prism and back to the polarization beam splitter. Different optical path lengths between the two paths may be obtained by defining the two paths so as to have different physical path lengths or by inserting a material having a different refraction index into one of the two paths, so as to cause the two paths to have different optical path lengths. However, those skilled in the art will appreciate that various other means for defining two paths having different optical path lengths are likewise suitable.

Half-wave waveplates are used to control the light polarization direction before light enters a polarization beam splitter, so as to define a desired angle between input light polarization direction and the fast axis of the spatial birefringent device, which further defines an equivalent angle for birefringent device orientation. The fast axis is usually along x-axis or y-axis, which is determined by the configuration of spatial birefringent device using a polarization beam splitter. The equivalent angle is the angle which would be utilized in a birefringent filter having birefringent crystals in order to obtain the same effect. That is, the equivalent angle of a spatial birefringent device according to the present invention is the angle between the fast axis of a birefringent crystal and the polarization direction of light input thereto which would be required in order to obtain the same optical effect that the spatial birefringent device of the present invention provides.

When more than one spatial birefringent device is utilized, then one or more half-waveplates are typically disposed between two adjacent polarization beam splitters, so as to control the light polarization direction before light entering each subsequent polarization beam splitter in order to define the equivalent angle.

Thus, the half-wave waveplates which light passes through prior to entering the polarization beam splitter of the present invention define the transmission characteristics (e.g., cross-talk) of the birefringent device assembly.

As discussed above, a half-wave waveplate is used to define the equivalent orientation angle for each birefringent device of the present invention. It is worthwhile to note that the equivalent orientation angle is controlled by manipulating the polarization direction of light input to the polarization beam splitter of each birefringent device. At the beam split point of the polarization beam splitter, the polarization direction of light which travels along the shorter of the two paths is the fast axis of the spatial birefringent device. Beyond the beam split point, the polarization directions of light traveling along the short path and the long path are manipulated so as to cause that light to be either transmitted or reflected again by the polarization beam splitter, such that the light from the two paths recombines and is transmitted in the desired direction (such as to the next birefringent device). Therefore, the polarization direction of light input to each birefringent device must be manipulated so as to obtain the desired equivalent angle. Manipulation of the polarization of light input to a birefringent device is accomplished by rotating the polarization direction flight input to a birefringent device by the desired amount utilizing a half-wave waveplate.

However, those skilled in the art will appreciate that, in some instances, light may be input directly into a birefringent element without requiring such manipulation, if polarized light already having the desired polarization direction is provided to that birefringent element.

The present invention thus comprises a method for interleaving, wherein the method comprises transmitting light through a birefringent device assembly in a first direction and then transmitting the light through the same birefringent device assembly in a second direction. The birefringent device assembly comprises at least one spatial birefringent device and the spatial birefringent device causes a first beam of light to travel along a first path and causes a second beam of light to travel along a second path. The first and second beams of light are preferably generally orthogonal with respect to one another. The first and second paths have different optical path lengths with respect to one another. The different optical paths length may be formed by either providing different physical path lengths or by providing materials having different refraction indices along the first and second paths. Before the light enters the birefringent device, its polarization direction is manipulated and controlled so as to obtain a desired equivalent angle for birefringent device orientation.

Transmitting the light through the same birefringent assembly in a second direction preferably comprises transmitting the light through the same birefringent assembly along generally the same path along with the light was transmitted in the first direction. The second direction is preferably opposite the first direction.

More particularly, the second direction is preferably parallel to the first direction and may be offset, i.e., laterally translated, with respect to the first direction. Although light traveling in the first direction will pass through some of the same components as light traveling in the second direction, light traveling in the first direction may also typically pass through unique components which light traveling in the second direction does not pass through and vice versa. Thus, light traveling in one direction may preferably pass through different quarter-wave waveplates and half-wave waveplates from light which travels in opposite direction.

Transmitting the light through the birefringent device assembly in both the first and the second directions mitigates crosstalk. Further, dispersion can be mitigated in interleavers having more than one spatial birefringent device.

According to the present invention, a birefringent filter or interleaver is constructed by utilizing the birefringent effect which results from differences in optical path lengths, either in free space, e.g., air, or in materials having desired indices of refraction. Thus, the need for birefringent crystals is eliminated. There are many advantages associated with such elimination of birefringent crystals. For example, the device construction is simplified and cost are minimized when birefringent crystals are eliminated. Further, various limitations associated with the use of birefringent crystals do not present which are inherent to the optical, physical, mechanical, and thermal properties of the birefringent crystals. For example, birefringent crystals provide a fixed birefringent value and are therefore not variable or tunable. However, the use of optical path length differences to obtain a birefringent affect facilitates easy tunability of birefringent values by simply varying the length of one or both of the paths and/or varying an index of refraction along one or both of the paths.

As those skilled in the art will appreciate, optical signal interleaving can be achieved utilizing a Solc birefringent filter, in which at least one, typically, a plurality, of birefringent elements are located intermediate two polarizing devices, such as an input polarizer and an output polarizer. A typical Solc birefringent filter comprises three birefringent crystals having orientation angles of 45°, -15° and 10° and birefringent phase delays of $\Gamma$, $2\Gamma$ and $2\Gamma$, respectively. The use of a birefringent filter having such crystal orientation angles and phase delays provides a generally acceptably flat passband. However, other sets of orientation angles (or equivalent orientation angles when spatial birefringent devices are utilized) and phase delays can provide transmission characteristics which are enhanced with respect to those of contemporary practice. For example, one such set of orientation angles which provides enhanced transmission characteristics is 45°, -21° and 7° for birefringent filters having first, second and third birefringent elements of phase delays of $\Gamma$, $2\Gamma$ and $2\Gamma$, respectively. The transmission characteristics of such a device include a flatter passband and a deeper and/or wider stopband, so as to substantially mitigate undesirable crosstalk.

The cross-talk can be further reduced by letting light pass through another birefringent filter. But this lead to higher cost due to the doubling in device numbers. In addition, according to contemporary practice, birefringent filters (wherein light passes therethrough only once and in a single direction) always introduce a finite, undesirably high, amount of dispersion. The dispersion introduced by such contemporary birefringent filters is sufficient to significantly degrade optical signal quality. Because of this degradation in optical signal quality, further advances in channel spacing reduction are difficult, if not impossible.

However, according to the present invention, an interleaver utilizing a birefringent filter is constructed in a manner which substantially mitigates crosstalk without additional birefringent devices. Further, dispersion can be substantially mitigated and eliminated without additional birefringent devices. This is accomplished by configuring the present invention such that light travels through the same birefringent filter twice or more times, in two generally opposite directions. Therefore, the present invention facilitates the construction of an interleaver which makes possible substantially reduced channel spacing, so as to desirably increase the effective bandwidth of an optical medium and thereby enhance the potential for channel count increases.

According to one embodiment of the present invention, a birefringent filter or interleaver can be formed, such that the dispersion vs. wavelength curve thereof is approximately zero for all wavelengths and thus such that the birefringent filter or interleaver itself contributes very little or no dispersion. Therefore, the interleaver of the present invention may be utilized to mitigate total dispersion within an optical system by minimizing its own introduction of undesirable dispersion.

In a birefringent filter, if $\phi_1$, $\phi_2$, and $\phi_3$ are the orientation angles for the first, second and third birefringent devices, then the same transmission performance is obtained for birefringent device orientations of $90°-\phi_1$, $90°-\phi_2$ and $90°-\phi_3$, as well as for birefringent device orientations of $90°+\phi_1$, $90°+\phi_2$ and $90°+\phi_3$, respectively. However, the dispersion curves are flipped about the zero dispersion axis for the sets of angles of $90°-\phi_1$, $90°-\phi_2$ and $90°-\phi_3$, as well as $90°+\phi_1$, $90°+\phi_2$ and $90°+\phi_3$, when taken with respect to the orientations of $\phi_1$, $\phi_2$ and $\phi_3$. That is, the dispersion curve of a birefringent filter having birefringent device orientations of $\phi_1$, $\phi_2$ and $\phi_3$ will be opposite to the dispersion curve of either a birefringent filter having birefringent element orientations of $90°-\phi_1$, $90°-\phi_2$ and $90°-\phi_3$ or a birefringent filter having birefringent device orientations of $90°+\phi_1$, $90°+\phi_2$ and $90°+\phi_3$. This is true when the phase delays of the first, second and third birefringent devices are in the same order.

It is possible to configure two birefringent device assemblies such that the birefringent devices thereof have phase delays which are and reverse order with respect to one another and wherein the dispersion curves for the two birefringent device assemblies are opposite to one another. It has been found that if $\phi_1$, $\phi_2$, and $\phi_3$ are the orientation angles for the first, second and third birefringent devices having a first order of phase delays, then the same transmission performance is obtained for birefringent devices orientations of $90°-\phi_3$, $90°-\phi_2$, and $90°-\phi_1$ or $90°+\phi_3$, $90°+\phi_2$ and $90°+\phi_1$ for a parallel component from the birefringent device assembly having angles of $\phi_1$, $\phi_2$, and $\phi_3$, as well as for birefringent device orientations of $\phi_3$, $\phi_2$ and $\phi_1$ or $-\phi_3$, $-\phi_2$ and $-\phi_1$ for an orthogonal component from the birefringent device assembly having angle orientations of $\phi_1$, $\phi_2$, and $\phi_3$. Again, the dispersion curves are flipped about the zero dispersion axis for these sets of angles with respect to the orientations of $\phi_1$, $\phi_2$ and $\phi_3$.

Thus, two different birefringent device assemblies may be constructed so as to substantially cancel the dispersion introduced by one another when either the order of the phase delays of each birefringent device assembly is the same or when the order of the phase delays of each birefringent device assembly are reversed with respect to one another.

Therefore, if an optical beam is transmitted through two interleavers sequentially, wherein the two interleavers have been designed such that they have flipped dispersion curves with respect to one another, then the dispersion of the two interleavers cancels and the total dispersion of the two interleavers is zero or approximately zero. However, this configuration typically requires at least two separate interleavers to achieve zero or approximately zero dispersion for both odd and even channels.

Dispersion can be substantially mitigated by transmitting an optical beam through a birefringent device assembly, such as a birefringent device assembly comprising three different birefringent devices, wherein the first device has a fast axis oriented at an angle of $\phi_1$, a second birefringent device has a fast axis thereof oriented at an angle of $\phi_2$, and a third birefringent device has a fast axis thereof oriented at an angle of $\phi_3$, all with respect to the polarization direction of the input. After the optical beam passes through the three birefringent devices, two separate sets of interleaved signals (odd channels and even channels) having polarizations which are orthogonal to one another are obtained. Then, the incident light is reflected, such as by a mirror or prism, and then travels back through the same set of birefringent devices in the reverse direction. Before the light travels back through the same set of birefringent devices in the reverse direction, the polarization directions of the odd channels and the even channels are aligned such that the angular orientation of the birefringent devices are $90°-\phi_3$, $90°-\phi_2$, $90°-\phi_1$ or $90°+\phi_3$, $90°+\phi_2$, $90°+\phi_1$ with respect to the input polarization direction of the returning light of the parallel component and $-\phi_3$, $-\phi_2$, $-\phi_1$ or $\phi_3$, $\phi_2$, $\phi_1$ with respect to the input polarization direction of the returning light of the orthogonal component.

When light travels through a birefringent assembly in the first direction, the birefringent device angles are $\phi_1$, $\phi_2$, $\phi_3$, and when light travels through the same birefringent device assembly in the reverse direction, the birefringent device angles are $90°-\phi_3$, $90°-\phi_2$, $90°-\phi_1$, or $90°+\phi_3$, $90°+\phi_2$, $90°+\phi_1$ for the parallel component and $-\phi_3$, $-\phi_2$, $-\phi_1$ or $\phi_3$, $\phi_2$, $\phi_1$ for the orthogonal component in the order in which light encounters the birefringent devices. Thus, it is possible to construct an interleaver which provides zero or approximately zero dispersion and which does not require the use of two separate birefringent filters, as discussed above. Such a zero dispersion interleaver may be constructed by folding the light path, such that incident light traveling through the birefringent filter in a forward direction is reflected back through the filter in a reverse direction.

Referring now to FIG. 1, a two-element birefringent filter or interleaver having a fold configuration according to one embodiment of the present invention is shown. The fold interleavers of the present invention provide low cross-talk and/or zero or very low dispersion by directing light which passes through a birefringent device assembly thereof back through the same birefringent device assembly in a direction opposite to the direction in which the light was first transmitted through the birefringent device assembly. In this manner, dispersion introduced into the light during its first pass through the birefringent device assembly is compensated for or cancelled during its second pass through the birefringent device assembly. That is, when light passes through the birefringent device assembly in the first direction, a first dispersion vs. wavelength curve results and when light passes through the birefringent device assembly in a second direction, generally opposite to the first direction, a second dispersion vs. wavelength curve results which is flipped or generally opposite to the first dispersion vs. wavelength curve, thus, result in a net dispersion resulting from both passes through the birefringent device assembly of zero or approximately zero dispersion. Since light travels through the birefringent device assembly twice (once in a first or forward direction and again in the second or reverse direction) the transmission characteristics of the interleaver are enhanced with respect to the transmission characteristics of light which passes through such an interleaver only once (such as in the forward direction only). Such enhanced transmission characteristics improve cross-talk.

Indeed, light may be transmitted through the birefringent device of the assembly of the present invention any desired number of times, so as to provide the desired transmission characteristics. As those skilled in the art will appreciate, transmitting light through the birefringent device assembly of the present invention an even number of times results in zero or nearly zero dispersion, since the dispersion introduced during transmission through the birefringent device assembly in one direction is substantially canceled by dispersion introduced during transmission through the birefringent device assembly in the opposite direction. However, if the dispersion characteristics of the interleaver are not important, then light may be transmitted through the birefringent device assembly an odd number of times.

As discussed in detail above, a right-hand coordinate system of axes is used to characterized the optical beam propagation in the system at various locations with a convention that the coordinate system is traveling with light and the light is always propagating in the +z direction and the +y direction is always out of the paper, as shown in FIG. 1.

Figure 2A:
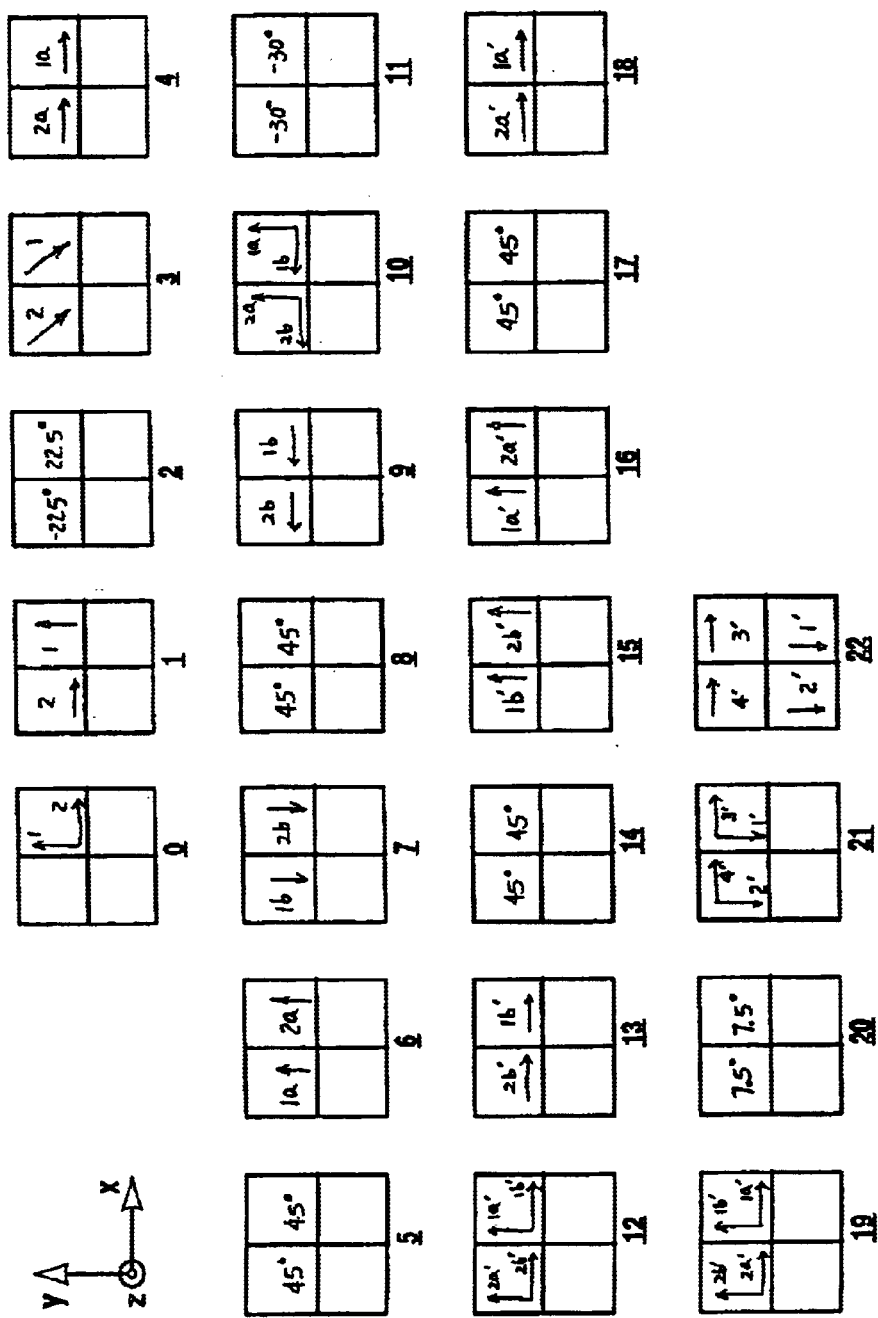
FIGS. 2a and 2b are schematic diagrams showing the optical beams states and the quarter-wave and half-wave waveplate orientations at different locations for an exemplary two-element fold interleaver of FIG. 1 which has equivalent birefringent element orientation angles of 45° and −15° and birefringent phase delays of $\Gamma$ and $2\Gamma$, respectively, for the two spatial birefringent device.
Figure 2A:
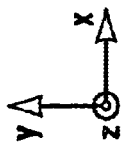
Figure 2B:
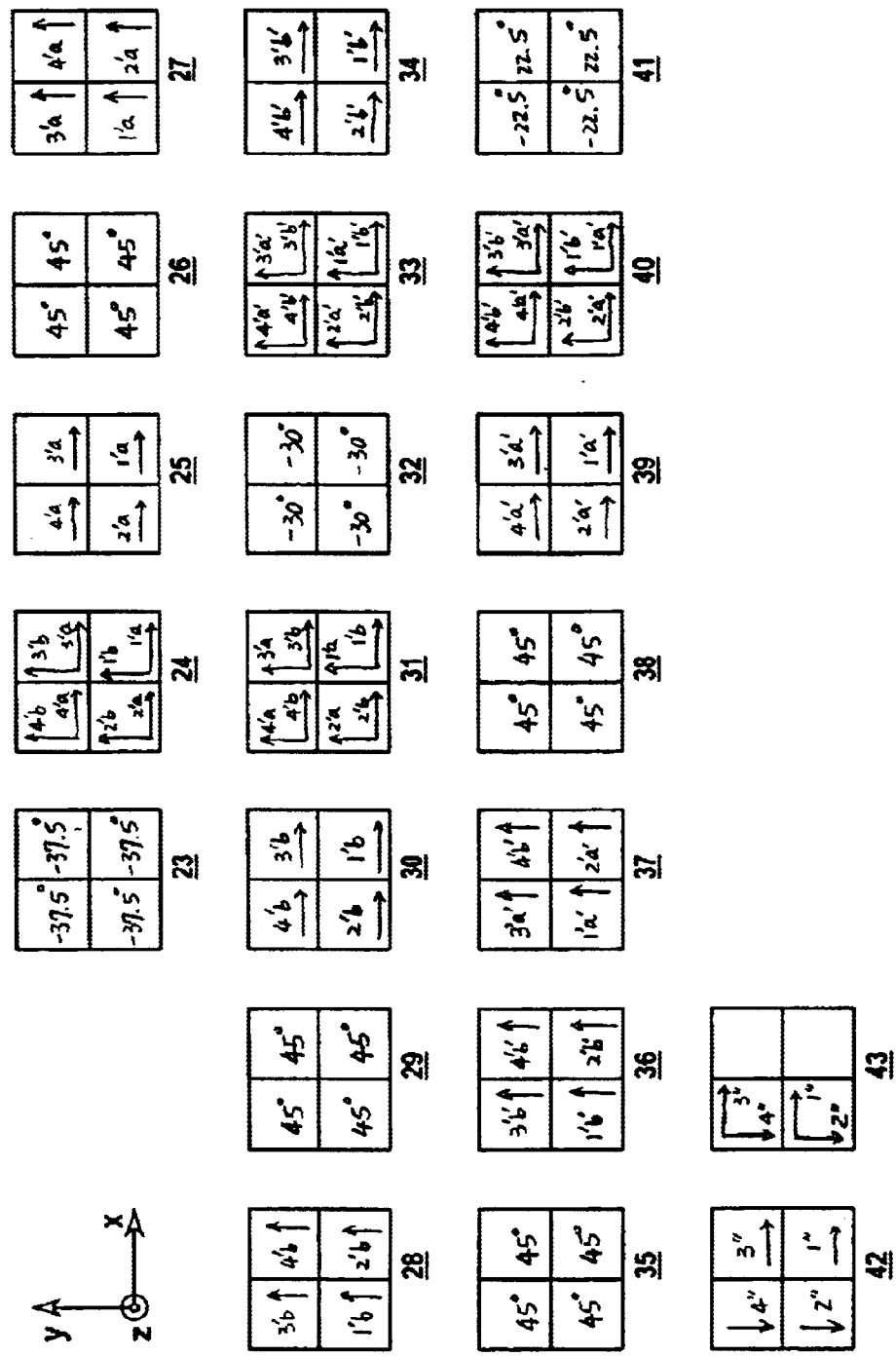

Referring now to FIGS. 2a and 2b, the optical beam states and the quarter-wave and half-wave waveplate orientations at various locations for an exemplary two-element fold interleaver of FIG. 1 are shown. The waveplates orientation shown in FIGS. 2a and 2b are such that they provide birefringent device orientations equivalent to the birefringent crystal orientations of 45° and −15° and provide phase delays which are equivalent to birefringent crystals of phase delays $\Gamma$ and $2\Gamma$, respectively. In FIGS. 2a and 2b, each of the four boxes correspond to a physical beam position at various locations. The polarization beam displacers 10, 11 and 18 shift the optical beams to these various beam positions according to the orientation of polarization beam displacer and the optical beam polarization. The optic axis orientation angles of the quarter-wave and half-wave waveplates shown in FIGS. 2a and 2b are referred to the +x axis at the corresponding locations. The birefringent effect derived by each spatial birefringent device of the birefringent device assembly 12 is determined by the distance difference between the polarization beam splitter and the mirrors thereof. The birefringent phase delay (difference) between the two corresponding components is $\Gamma_1$ for device one and $\Gamma_2$ for device two, respectively, according to the formula:

$$\Gamma_1 = 2 \cdot (L_1 - L_2) \cdot 2\pi/\lambda = L \cdot 2\pi/\lambda = \Gamma$$

$$\Gamma_2 = 2 \cdot (L_3 - L_4) \cdot 2\pi/\lambda = 2L \cdot 2\pi/\lambda = 2\Gamma$$

Where $\lambda$ is the optical wavelength.

The polarization beam splitter 19a, the quarter-wave waveplate 23a, the mirror 14a, the quarter-wave waveplate 22a, the mirror 15a and the half-wave waveplates 30 define a portion of the first birefringent device of the birefringent device assembly 12. An input polarization beam displacer 10 provide light to half-wave waveplates 30 from which the light is transmitted into polarization beam splitter 19a. The input polarization beam displacer 10 separates light input to the interleaver into two optical beams having known polarization directions, such that the polarization directions of the two optical beams can be controlled (such as by a half-wave waveplate) to define the desired equivalent birefringent device orientation angles. As mentioned above, if polarized light having a known polarization direction is provided to the interleaver, then the input beam displacer 10 may be eliminated (and the two composite beams resulting therefrom will be reduced to a single beam).

Polarization beam splitter 19a separates an optical beam into two components. The first component having polarization direction along x-axis is transmitted straight there through to quarter-wave waveplate 23a and mirror 14a. Mirror 14a reflects the light back through quarter-wave waveplate 23a and into polarization beam splitter 19a. The second component of the light having a polarization generally orthogonal to the first component (along y-axis) is deflected by polarization beam splitter 19a through quarter-wave waveplate 22a and is reflect by mirror 15a back through polarization beam splitter 19a. The polarization direction of the first component is changed by 90° by the combination of the mirror and the quarter-wave waveplate 23a, (having an optical axis thereof oriented at 45° with respect to the +x axis), so that the first component is reflected by the polarization beam splitter 19a to location 10 when the first component is transmitted back to the polarization beam splitter 19a. In a similar manner, the polarization direction of the second component is changed by 90° by the cooperation of the mirror and the quarter-wave waveplate 22a (having an optical axis thereof oriented at 45° with respect to the +x axis), so that it is transmitted through the polarization beam splitter 19a to location 10 when it is transmitted back to the polarization beam splitter 19a. The first and second components are together at location 10. Light from the polarization beam splitter 19a is transmitted to a second birefringent device of the birefringent device assembly 12 which comprises half-wave waveplates 33a, a polarization beam splitter 19b, quarter-wave waveplate 23b, minor 14b, quarter-wave waveplate 21b and mirror 15b, all of which operate in a manner analogous to the corresponding components of the first birefringent element. Thus, the birefringent device assembly comprises two elements, as shown in FIG. 1. The quarter-wave waveplates 21a, 22a, 23a, 24a, 21b, 22b, 23b and 24b orient light returning from the mirrors the light is either transmitted through or reflected by the corresponding polarization beam splitter and the two components recombine. For example, quarter-wave waveplate 22a orients the polarization direction of light from mirror 15a such that that component of the light is transmitted through the polarization beam splitter 19a and quarter-wave waveplate 23a orients the polarization direction of light from mirror 14a such that light from mirror 14a is reflected by the polarization beam splitter 19a to location 10.

The polarization beam splitters (such as 19a and 19b of FIG. 1 and 19a, 19b, and 19c of FIG. 9) may comprise either single polarization beam splitters as shown, or may alternatively comprise multiple polarization beam splitters. For example, separate polarization beam splitters may be utilized at each point where light is separated and recombined, thereby replacing each polarization beam splitter shown in FIG. 1 or FIG. 9 with four separate polarization beam splitters. As a further alternative, each polarization beam splitter shown in FIG. 1 and FIG. 9 may be replaced with two polarization beam splitters, wherein one polarization beam splitter splits and recombines light traveling in the forward direction through the birefringent device assembly and the other polarization beam splitter separates and combines the light traveling in the opposite direction (back through the birefringent device assembly).

As shown in FIG. 1, distance $L_1$ and distance $L_2$ are different with respect to one another, so as to provide the desired phase delay and the consequent birefringent effect. Similarly, distances $L_3$ and $L_4$ of the second birefringent device are different, again so as to provide the desired phase delay and the consequent birefringent effect for the second birefringent device.

Half-wave waveplates 30 and 33a are used to manipulate the input light polarization directions for desired equivalent birefringent element orientation angles $\phi_1$ and $\phi_2$, respectively. After exiting the birefringent device assembly 12, light from the polarization beam splitter 19b is transmitted through half-wave waveplate 34 to prism 13. After the light has been transmitted through half-wave waveplate 34 and polarization beam displacer 18, then the light has effectively passed through an interleaver. Transmitting the light back through the birefringent device assembly 12 effectively causes the light to pass through another interleaver having equivalent birefringent device orientation angles for zero dispersion, which are determined by the orientation of half-wave waveplates 35 and 32a. Thus, enhanced transmission characteristics and mitigated (nearly zero) dispersion can be obtained. In effect, the input light provided to the interleaver of FIG. 1 passes through two interleavers wherein the first interleaver introduces dispersion and the second interleaver (which comprises the same physical components as the first interleaver) introduces substantially the opposite dispersion, such that the dispersion of the first interleaver and the dispersion of the second interleaver substantially cancel one another.

To summarize operation of the folded interleaver of FIG. 1, the input beam displacer 10 receives a composite (light of unknown polarization direction) beam and separates the composite beam into two beams of known polarization directions. The half-wave waveplates 30 orient the polarization directions of the two composite beams such that the two composite beams have the same polarization direction and such that the polarization direction provides the desired equivalent angle (the angle which provides birefringent filter element performance similar to that of a corresponding birefringent crystal). The polarization beam splitter, in cooperation with associated mirrors and associated quarter-waveplates provide two separate paths, wherein each path has a different optical path length with respect to the other path. The polarization beam splitter splits each of the two beams provided by the polarization beam displacer 10 into two orthogonally polarized components, respectively. Each component travels along one of the two paths (having different optical path lengths) so as to provide a birefringent effect when the two components are recombined. This process is repeated as necessary and additional birefringent elements (comprised of additional polarization beam splitters, additional quarter-wave waveplates and additional mirrors) so as to provide the desired birefringent filtering effect. The equivalent angle of each birefringent element is determined by the half-wave waveplate through which light is transmitted prior to entering the polarization beam splitter.

Thus, after light has passed through half-wave waveplate 34 and intermediate beam displacer 18, the light has been separated into odd and even channels. Prism 13 deflects light through polarization beam displacer 18 and back into the birefringent device assembly 12 where the light passes through half-wave waveplates 35, polarization beam splitter 19*b*, quarter-wave waveplate 24*b*, quarter-wave waveplate 22*b*, half-wave waveplate 32*a*, quarter-wave waveplate 24*a*, and quarter-wave waveplate 21*a*, while being reflected by mirrors 14*a*, 14*b*, 15*a* and 15*b* in a manner analogous to the manner in which light is transmitted through birefringent device assembly 12 in the first direction.

Light which has been transmitted back through the birefringent device assembly 12 as transmitted through half-wave waveplates 31 and output polarization beam displacer 11 so as to form two light beams, one of which contains the odd channels and the other contains the even channels.

When only two birefringent devices are utilized, then the order of the birefringent devices is not important. That is, if a first equivalent angle and first phase delay is associated with the first birefringent device and a second equivalent angle and second phase delay associated with the second birefringent device, an equivalent interleaver is constructed by making the first birefringent device have the second equivalent angle and the second phase delay and making the second birefringent device have the first equivalent angle and the first phase delay.

After the optical beams propagate from location 0 to location 22, they have been subject to an effect equivalent to that of a two-element birefringent filter or interleaver utilizing birefringent crystals, where the orientation of the first birefringent crystal is $\phi_1=45°$ (phase delays $\Gamma_1$) and the orientation of the second birefringent crystal is $\phi_2=-15°$ (phase delays $\Gamma_2$), both with respect to the input polarization direction of the forward light. The beam components 1' and 2' (odd channels) as well as the beam components 3' and 4' (even channels) correspond to the two series of interleaved channels.

The half-wave waveplate at location 23 changes the optical beam polarization directions in such a way that they align the polarization directions of the odd and the even channels along the desired direction to obtain zero dispersion. After the optical beams propagate from location 24 to location 43, they have been subject to an effect equivalent to that of another two-element birefringent filter or interleaver utilizing birefringent crystals, where the orientation of the first birefringent element is $90°-\phi_2=105°$ (phase delay $\Gamma_2$) and the orientation of the second birefringent element is $90°-\phi_1=45°$ (phase delay $\Gamma_1$), both with respect to the input polarization direction of the returning light of the parallel component and the orientation of the first birefringent element is $-\phi_2=15°$ (phase delay $\Gamma_2$) and the orientation of the second birefringent element is $-\phi_1=-45°$ (phase delay $\Gamma_1$), both with respect to the input polarization direction of the returning light of orthogonal component.

Thus, the dispersion caused by optical beams propagating from location 22 to location 43 cancels the dispersion caused by optical beams propagating from location 0 to 22. In addition, the half-wave waveplates at various locations in the apparatus are controlled to ensure that the optical beams are polarized along the appropriate direction required to obtain the desired passband and stopband characteristics.

In FIG. 2*b*, the two output beams 1" and 2" (even channels) and 3" and 4" (odd channels) are the two series interleaved channels having zero or approximately zero dispersion.

Figure 3:
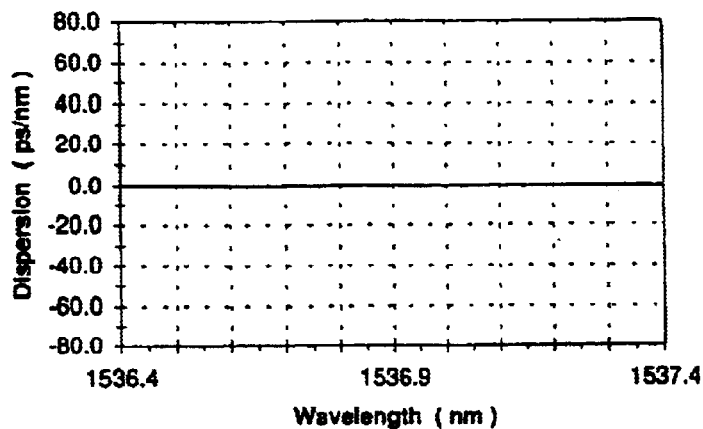
FIG. 3 is a dispersion vs. wavelength chart for an exemplary 50 GHz fold interleaver having equivalent birefringent element orientations of 45° and −15° and having phase delays of $\Gamma$ and $2\Gamma$ and constructed as shown in FIG. 1.
Figure 4:
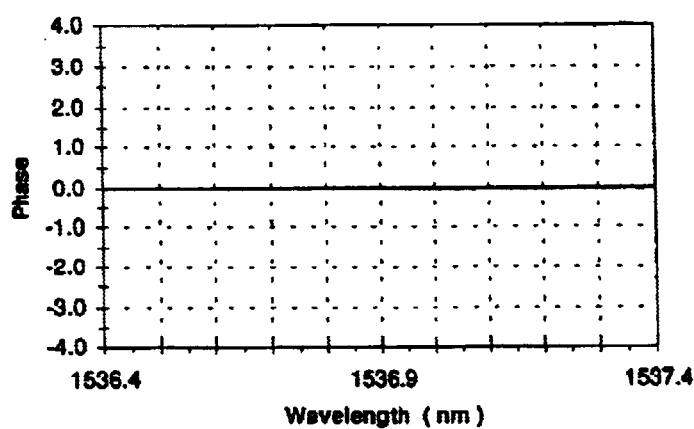
FIG. 4 is a phase vs. wavelength chart for an exemplary 50 GHz fold interleaver having equivalent birefringent element orientations of 45° and −15° and having phase delays of $\Gamma$ and $2\Gamma$ and constructed as shown in FIG. 1.
Figure 5:
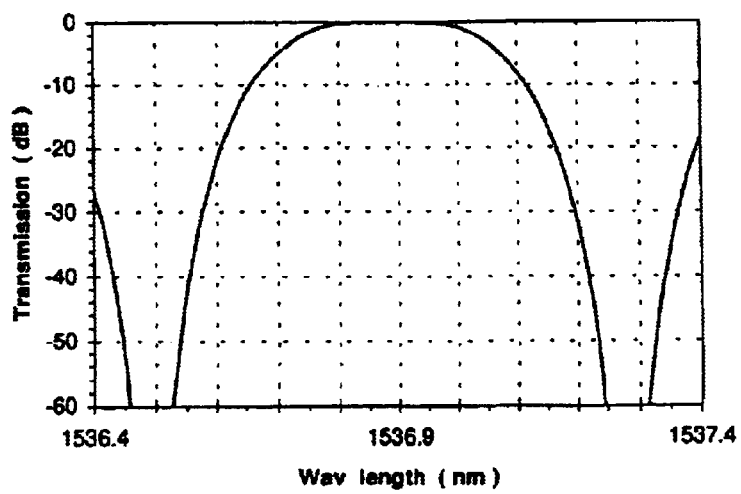
FIG. 5 is a transmission vs. wavelength chart for an exemplary 50 GHz fold interleaver having equivalent birefringent element orientations of 45° and −15° and having phase delays of $\Gamma$ and $2\Gamma$ and constructed as shown in FIG. 1.

Referring now to FIG. 3, the dispersion provided by the two-element fold interleaver of FIGS. 1, 2*a* and 2*b* is shown for one of the interleaved channels. Similarly, FIG. 4 shows the phase vs. wavelength and FIG. 5 shows the transmission vs. wavelength for the two-element fold interleaver of FIG. 1, where the equivalent birefringent orientation angles are 45°, –15° and phase delays are $\Gamma$, $2\Gamma$, respectively.

Figure 6:
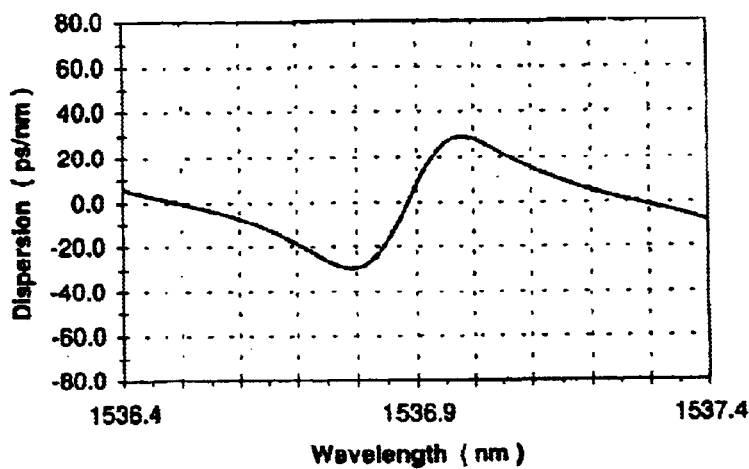
FIG. 6 is a dispersion vs. wavelength chart for a non-fold interleaver having birefringent element orientations of 45° and −15° and having phase delays of $\Gamma$ and $2\Gamma$.
Figure 7:
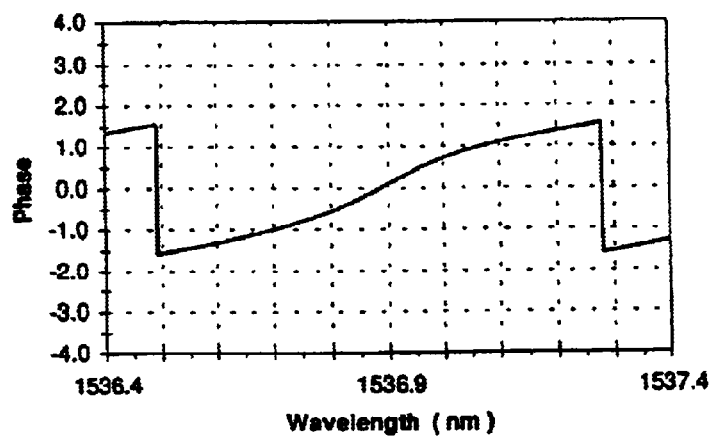
FIG. 7 is a phase vs. wavelength chart for a non-fold interleaver having birefringent element orientations of 45° and −15° and having phase delays of $\Gamma$ and $2\Gamma$.
Figure 8:
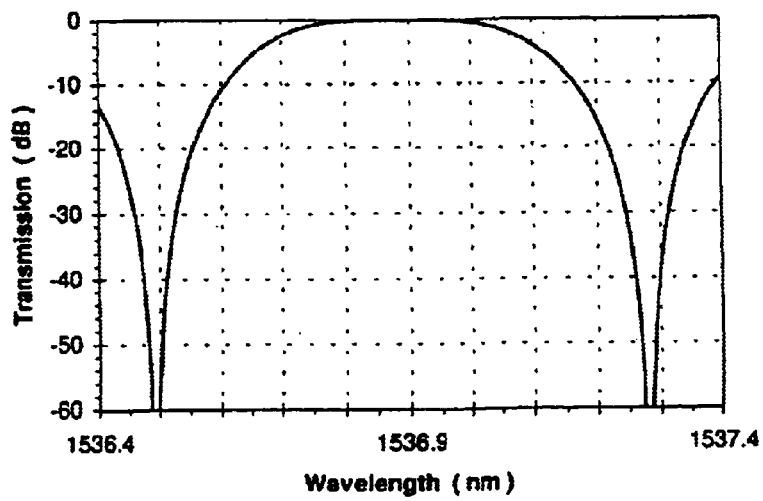
FIG. 8 is a transmission vs. wavelength chart for a non-fold interleaver having birefringent element orientations of 45° and −15° and having phase delays of $\Gamma$ and $2\Gamma$.

Referring now to FIG. 6, the dispersion for a two-element non-fold interleaver having birefringent element orientations of 45° and –15° and having phase delays of $\Gamma$ and $2\Gamma$ is shown. It is clear that the dispersion of the non-fold interleaver shown in FIG. 6 is substantially greater than that of the corresponding fold interleaver of FIG. 3. FIG. 7 shows the phase vs. wavelength and FIG. 8 shows the transmission vs. wavelength for the two-element non-fold interleaver.

Figure 9:
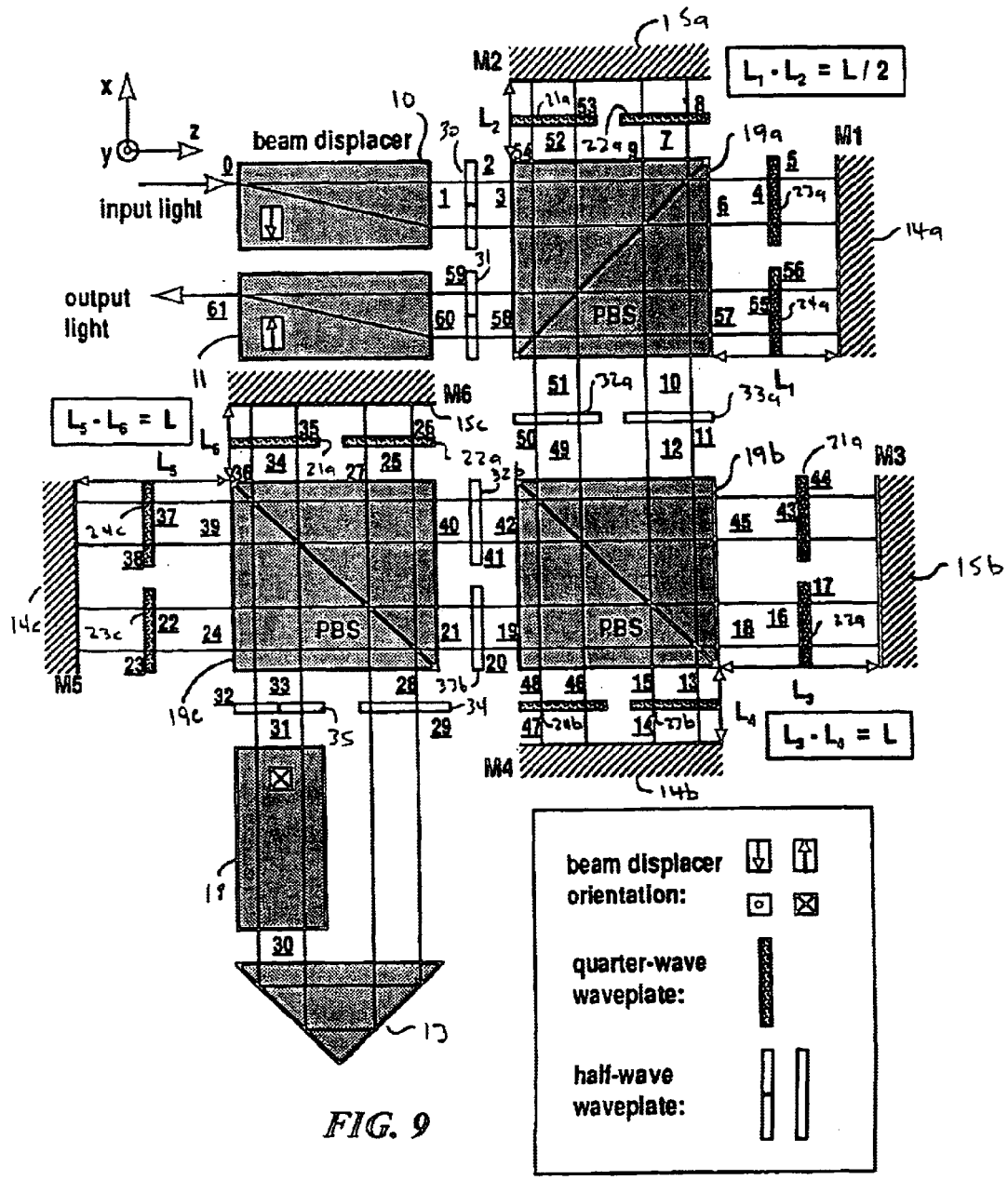
FIG. 9 is a top view schematic diagram of a three-element fold interleaver constructed according to the present invention.

Referring now to FIG. 9, a top schematic view of a three-element fold interleaver is shown. The use of three birefringent elements can provide a flatter and wider passband and a deeper and wider stopband as compared to the two-element fold interleaver of FIG. 1. Structure and operation of the three-element fold birefringent filter is generally analogous to that of the two-element fold birefringent filter.

Figure 10A:
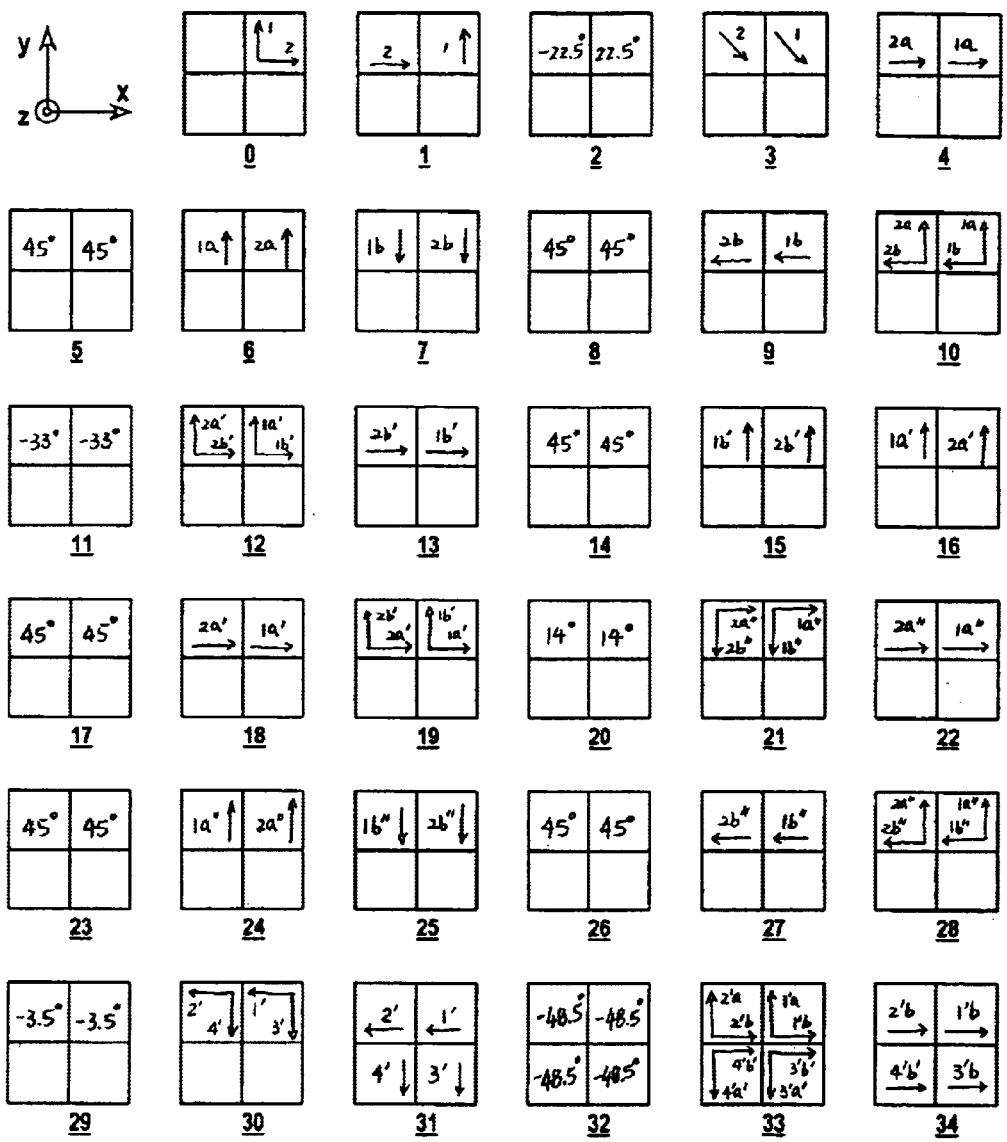
FIGS. 10a and 10b are schematic diagrams showing the optical beams states and the quarter-wave and half-wave waveplate orientations at different locations for an exemplary the three-element birefringent fold interleaver of FIG. 9 which has equivalent birefringent element orientation angles of 45°, −21° and 7° and birefringent phase delays of $\Gamma$, $2\Gamma$ and $2\Gamma$, respectively, for the three spatial birefringent device.
Figure 10B:
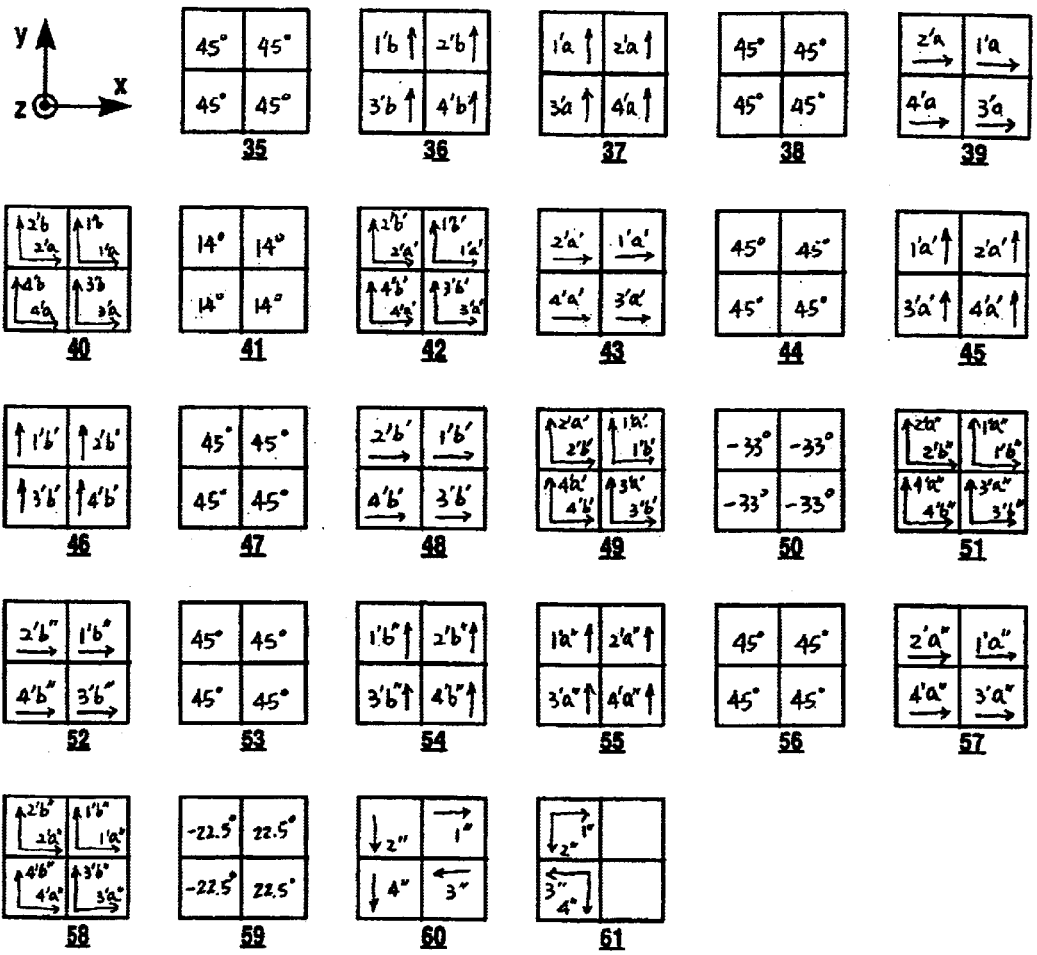

Referring now to FIGS. 10*a* and 10*b*, the optical beam states and the quarter-wave and half-wave waveplate orientations at various locations for an exemplary three-element fold interleaver of FIG. 9 are shown, where the equivalent birefringent element orientations are 45°, –21°, 7° and phase delays are $\Gamma$, $2\Gamma$, $2\Gamma$, respectively, for the three birefringent elements. The optic axis orientation angles of the quarter-wave and half-wave waveplates shown in FIGS. 10*a* and 10*b* are referred to the +x axis at the corresponding locations.

Preferably, the phase delay for the second spatial birefringent device and the third spatial birefringent device of the three-element interleaver are twice that of the first spatial birefringent device $\Gamma_1=L\cdot 2\pi/\lambda$, $\Gamma_2=\Gamma_3=2L\cdot 2\pi/\lambda$. The channel spacing is determined by the phase delay of the first device ($\Gamma_1$). The half-wave waveplates at various locations in the apparatus are controlled to ensure that the optical beams are polarized along the appropriate direction so that the desired passband and stopband characteristics are obtained. In FIG. 10*b*, The two output beams 1", and 2" (odd channels) and 3" and 4" (even channels) are the two series of interleaved channels of having zero or nearly zero dispersion.

When three birefringent devices are utilized, as shown in FIG. 9, then the equivalent angle and phase delay associated with the first birefringent device may be swapped with the equivalent angle and phase delay associated with the third birefringent device. That is, for a first birefringent device having a first equivalent angle and a first phase delay and a third birefringent device having a third equivalent angle and a third phase delay, then equivalent performance is obtained when the first birefringent device has the third equivalent angle and the third phase delay and the third birefringent device has the first equivalent angle and the first phase delay.

Figure 11:
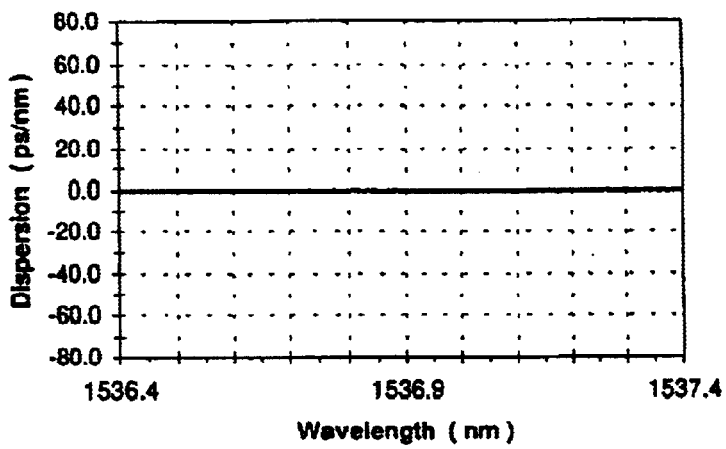
FIG. 11 is a dispersion vs. wavelength chart for an exemplary 50 GHz fold interleaver having equivalent birefringent element orientations of 45°, −21° and 7° and having phase delays of $\Gamma$, $2\Gamma$ and $2\Gamma$ and constructed as shown in FIG. 9.

Referring now to FIG. 11, the dispersion vs. wavelength for the three device fold interleaver of FIGS. 9, 10*a* and 10*b* for one of the interleaved channels is shown. The dispersion is zero or approximately zero for all wavelengths.

Figure 12:
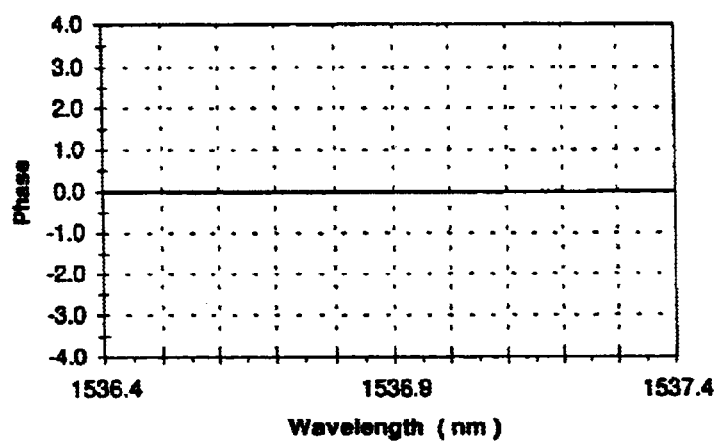
FIG. 12 is a phase vs. wavelength chart for an exemplary 50 GHz fold interleaver having equivalent birefringent element orientations of 45°, −21° and 7° and having phase delays of $\Gamma$, $2\Gamma$ and $2\Gamma$ and constructed as shown in FIG. 9.
Figure 13:
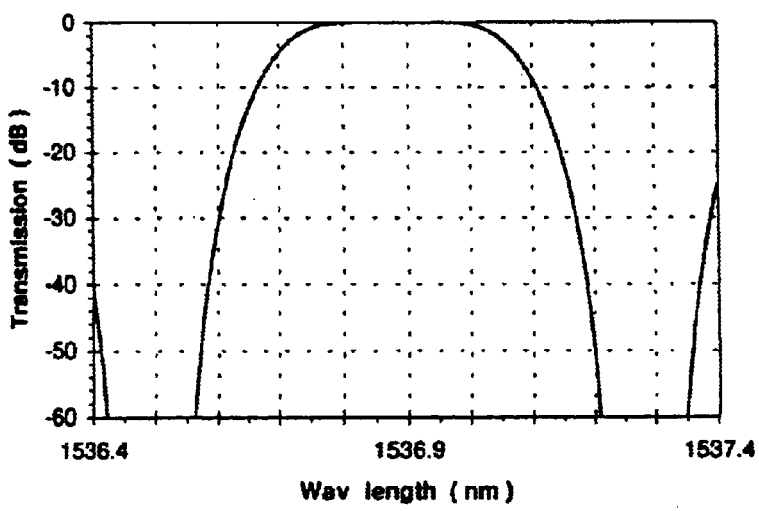
FIG. 13 is a transmission vs. wavelength chart for an exemplary 50 GHz fold interleaver having equivalent birefringent element orientations of 45°, −21° and 7° and having phase delays of $\Gamma$, $2\Gamma$ and $2\Gamma$ and constructed as shown in FIG. 9.

FIG. 12 shows the phase vs. wavelength and FIG. 13 shows the transmission vs. wavelength for the exemplary three-element fold interleaver of FIGS. 9, 10a and 10b.

Figure 14:
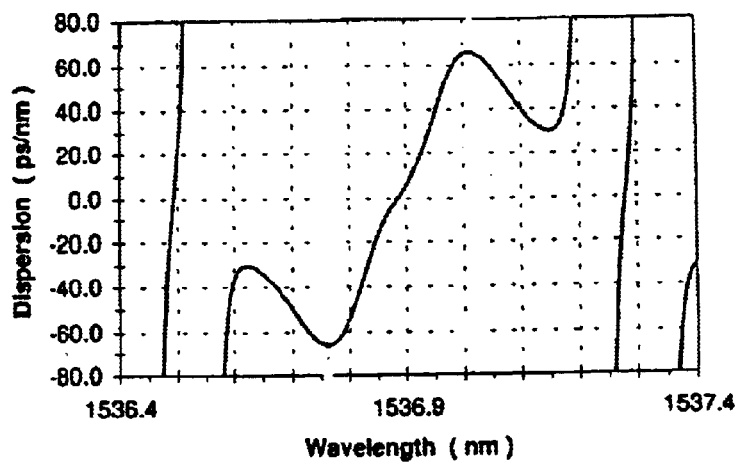
FIG. 14 is a dispersion vs. wavelength chart for a 50 GHz non-fold interleaver having birefringent element orientations of 45°, −21° and 7° and having phase delays of $\Gamma$, $2\Gamma$ and $2\Gamma$.
Figure 15:
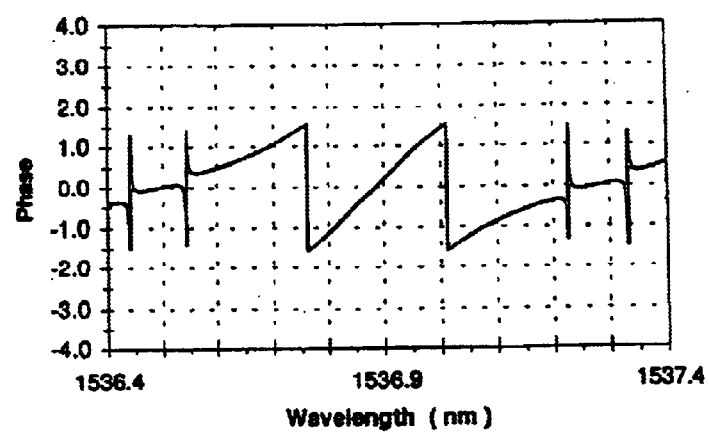
FIG. 15 is a phase vs. wavelength chart for a 50 GHz non-fold interleaver having birefringent element orientations of 45°, −21° and 7° and having phase delays of $\Gamma$, $2\Gamma$ and $2\Gamma$.

Referring now to FIG. 14, the dispersion vs. wavelength for a non-fold interleaver having equivalent birefringent device orientation of 45°, −21° and 7° and having phase delays of $\Gamma$, $2\Gamma$ and $2\Gamma$ is shown. It is clear that the dispersion for the non-fold three device interleaver shown in FIG. 14 is substantially greater than the dispersion for the three device fold interleaver shown in FIG. 11.

Figure 16:
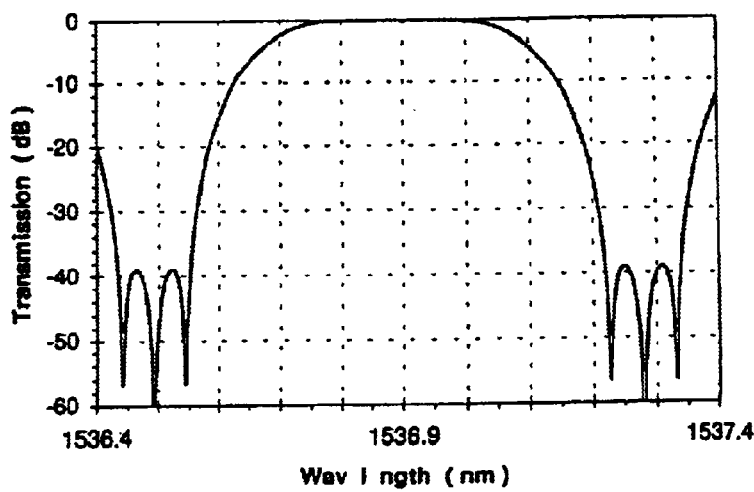
FIG. 16 is a transmission vs. wavelength chart for a 50 GHz non-fold interleaver having birefringent element orientations of 45°, −21° and 7° and having phase delays of Γ, 2Γ and 2Γ.

Further, it is also clear that the transmission characteristic of the fold interleavers of FIG. 5 (two-element) and FIG. 13 (three-element) are superior to those of the non-fold interleavers of FIG. 8 (two-element) and FIG. 16 (three-element). More particularly, the stopband, the −30 dB bandwidth is substantially wider for the fold interleaver than for the non-fold interleaver. Additionally, crosstalk of almost −80 dB is obtained for the three-element fold interleaver, which is substantially better than that for the three-element non-fold interleaver.

As those skilled in the art will appreciate, it is possible to obtain further improvements in the passband and stopband characteristics of such multi-element interleavers by providing greater than three birefringent elements. Thus, an interleaver may be formed so as to have four elements, five elements, or more elements, as desired.

Figure 17:
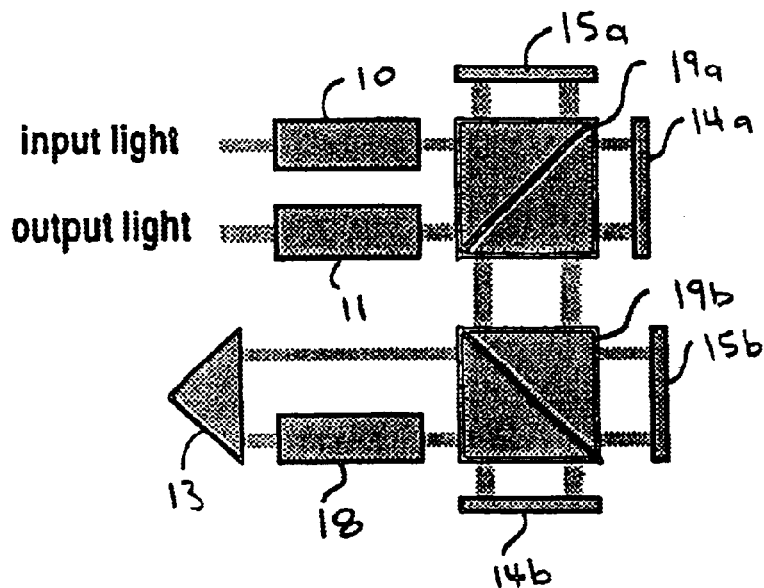
FIG. 17 is a top view schematic diagram of an alternative configuration of a two-element fold interleaver according to the present invention.
Figure 18:
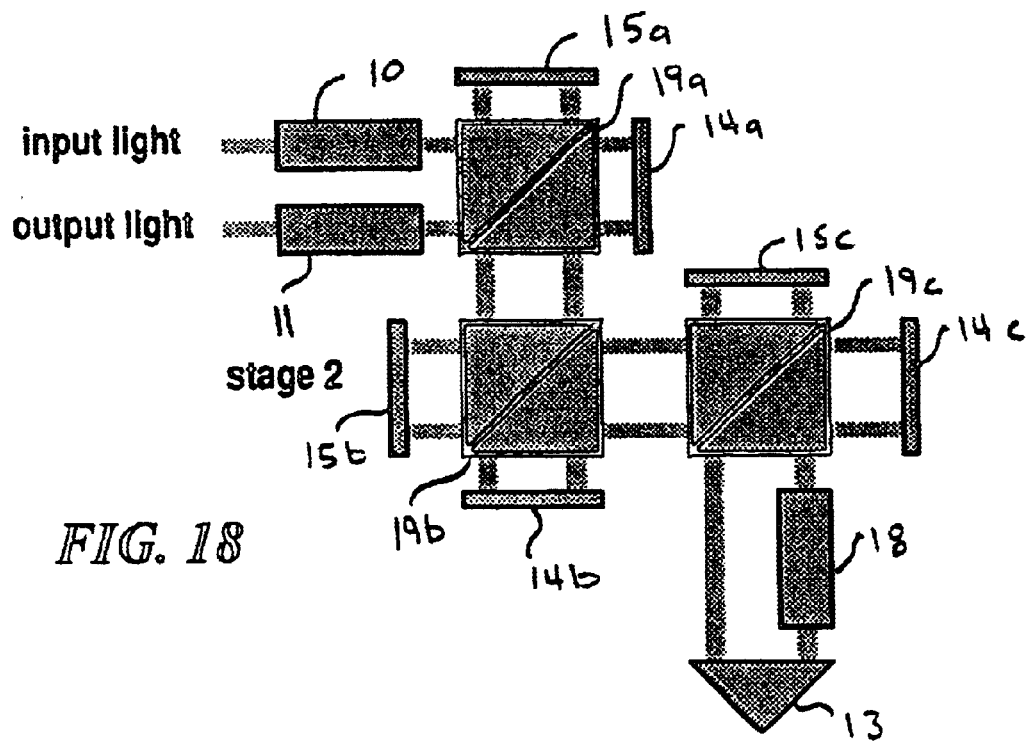
FIG. 18 is a top view schematic diagram of an alternative configuration of a three-element fold interleaver according to the present invention.

Referring now to FIGS. 17 and 18, alternative layout configurations for two device fold interleaver and the three device fold interleavers are shown. The waveplates are omitted for clarity.

Figure 19:
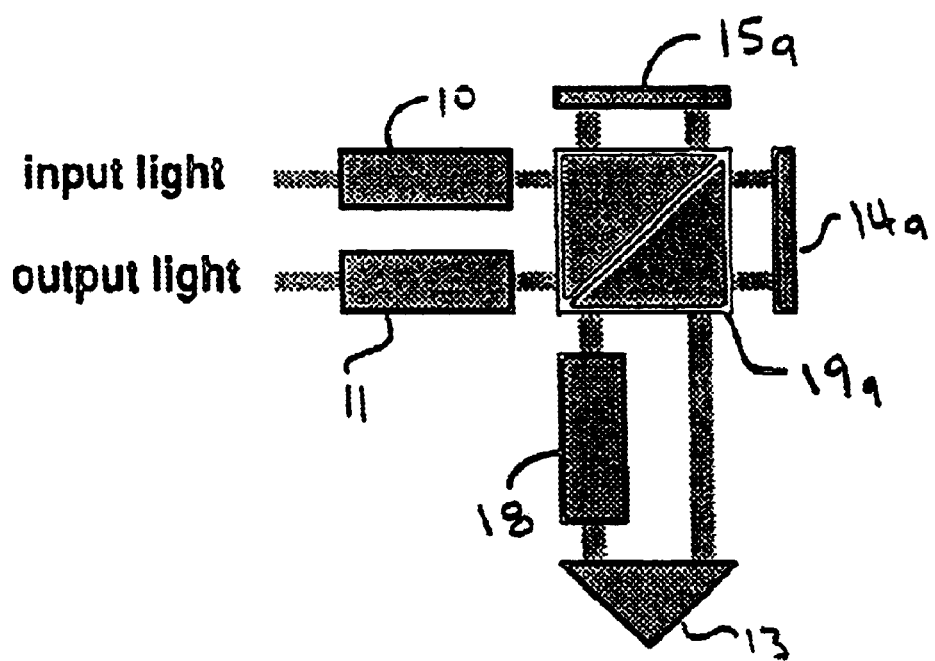
FIG. 19 is a top view schematic diagram of a configuration of a one-element fold interleaver according to the present invention.

Referring now to FIG. 19, a one-element fold interleaver may be useful in some applications. Although dispersion in a one-element non-fold interleaver is zero, the use of a one-element fold interleaver provides enhanced stopband characteristics. More particularly, a wider stopband can be obtained with a one-element fold interleaver than can be obtained with a corresponding one-element non-fold interleaver.

For the configuration of FIGS. 17–19, also for that of FIGS. 1 and 9, the light beams can comprise a plurality or array of separate light beams or channels. Thus, a plurality of such channels can be processed simultaneously by a fold interleaver constructed according to the present invention.

Other configurations are possible according to the present invention, for example Table I below summarizes the first stage phase delays, first stage orientations, second stage phase delays, and second stage orientations for possible embodiment of present invention. As discussed in detail below, it should be noted that the first stage is comprised of the spatial birefringent device assembly when light passes therethrough in on one direction and the second stage is comprised generally of the same birefringent device assembly when light passes therethrough in the opposite direction.

TABLE I

| First Stage Phase Delays | First Stage Orientations | Second Stage Phase Delays | Second Stage Orientations |
| --- | --- | --- | --- |
| $\Gamma + 2m_1\pi$, $2\Gamma + 2m_2\pi$, $2\Gamma + 2m_3\pi$ | $\phi_1, \phi_2, \phi_3$ | $2\Gamma' + 2k_3\pi$, $2\Gamma' + 2k_2\pi$, $\Gamma' + 2k_1\pi$ | $90° \pm \phi_3, 90° \pm \phi_2, 90° \pm \phi_1$ (parallel component) $\pm\phi_3, \pm\phi_2, \pm\phi_1$ (orthogonal component) where $\Gamma - \Gamma' = 2l\pi$ |
| $\Gamma + 2m_1\pi$, | $\phi_1, \phi_2, \phi_3$ | $2\Gamma' + 2k_3\pi$, | $90° \pm \phi_3, 90° \pm \phi_2, 90° \pm \phi_1$ |

TABLE I-continued

| First Stage Phase Delays | First Stage Orientations | Second Stage Phase Delays | Second Stage Orientations |
| --- | --- | --- | --- |
| $2\Gamma + 2m_2\pi$, $2\Gamma + 2m_3\pi$ | | $2\Gamma' + 2k_2\pi$, $\Gamma' + 2k_1\pi$ | (parallel component) $\pm\phi_3, \pm\phi_2, \pm\phi_1$ (orthogonal component) where $\Gamma - \Gamma' = (2l + 1)\pi$ |
| $2\Gamma + 2m_3\pi$, $2\Gamma + 2m_2\pi$, $\Gamma + 2m_1\pi$ | $\phi_3, \phi_2, \phi_1$ | $\Gamma' + 2k_1\pi$, $2\Gamma' + 2k_2\pi$, $2\Gamma' + 2k_3\pi$ | $90° \pm \phi_1, 90° \pm \phi_2, 90° \pm \phi_3$ (parallel component) $\pm\phi_1, \pm\phi_2, \pm\phi_3$ (orthogonal component) where $\Gamma - \Gamma' = 2l\pi$ |
| $2\Gamma + 2m_3\pi$, $2\Gamma + 2m_2\pi$, $\Gamma + 2m_1\pi$ | $\phi_3, \phi_2, \phi_1$ | $\Gamma' + 2k_1\pi$, $2\Gamma' + 2k_2\pi$, $2\Gamma' + 2k_3\pi$ | $\pm\phi_1, \pm\phi_2, \pm\phi_3$ (parallel component) $90° \pm \phi_1, 90° \pm \phi_2, 90° \pm \phi_3$ (orthogonal component) where $\Gamma - \Gamma' = (2l + 1)\pi$ |

Wherein $m_1$, $m_2$, $m_3$, $k_1$, $k_2$, $k_3$ and l are integers (0, ±1, ±2, ...).

The fourth column of Table I (entitled Second Stage Orientations) shows four sets of birefringent device orientations for each configuration. Two sets of angles for the parallel component are provided and two sets of angles for the orthogonal component are provided.

It is important to recognize that the first stage has two separate outputs or components. One of the two outputs or components from the first stage has a polarization direction which is parallel to the polarization direction of light that is input to the first stage and is therefore referred to herein as the parallel component. The other of the two outputs or components from the first stage has a polarization direction which is orthogonal to the polarization direction of light that is input to the first stage and is therefore referred to herein as the orthogonal component.

Light from the birefringent device assembly is directed back into the same birefringent device assembly in a direction which is opposite to that direction in which light first traveled through the birefringent device assembly. As light travels through the birefringent device assembly in the first direction, the birefringent device assembly may be considered as a first stage. When light travels back through the birefringent device assembly in the second or reverse direction, the birefringent device assembly may be considered as a second stage. Therefore, the parallel component and the orthogonal component from the first stage are transmitted through birefringent device of the second stage. It is important to remember that the first and second stages are actually the same birefringent device assembly, with light being transmitted therethrough in one direction so as to define a first stage of interleaving and light being transmitted therethrough in a second or reverse direction so as to define a second stage of interleaving.

When the phase delays of the first stage are reversed in order with respect to the phase delays of the second stage, then the parallel component and the orthogonal component are transmitted through birefringent device having different angular orientations, as also shown in Table I.

As those skilled in the art will appreciate, transmitting the parallel component and the orthogonal component through birefringent device having different angular orientations can be accomplished in various different ways. For example, the parallel component and the orthogonal component may be transmitted through two different sets of birefringent device (which define the second stage), with each set having angular orientations which are appropriate for that component. Alternatively, polarization rotators (such as half-wave waveplates) may be used to align the parallel component and/or the orthogonal component such that the required orientation angles are provided and only a single set of birefringent device is required for the second stage.

Although Table I lists three elements in each stage, similar results can be achieved by utilizing only two elements, for example, ($\Gamma$, $\phi_1$) and ($2\Gamma$, $\phi_2$). Generally, when only two elements are utilized, the transmission characteristics will not be as good as the case for three elements. However, the lower cost of manufacturing such two element devices makes them desirable for some applications.

It is important to note that where the ± is used in the table above, for a particular output component from the first stage (either the parallel component or the orthogonal component) the sign will be either + for all three values or − for all three values. For example, the first set of second stage orientations will always be either $90°\phi_1$, $90°+\phi_2$, and $90°+\phi_3$, or $90°-\phi_1$, $90°-\phi_2$, and $90°-\phi_3$ for the parallel component and will never have mixed signs such as $90°+\phi_1$, $90°-\phi_2$, and $90°+\phi_3$.

In addition to manipulating the angular orientation of birefringent device in the first and second stages of an interleaver or the like so as to provide approximately zero dispersion, Table I shows that it is also possible to manipulate the phase delays of the birefringent device so as to provide approximately zero dispersion. Thus, various combinations of angular orientations of the birefringent device and phase delays thereof may be utilized so as to provide approximately zero dispersion.

However, it is important to appreciate that when light is transmitted back through the same set of birefringent device that the light was first transmitted through, such that the light travels through the same set of birefringent device in two different directions, then the phase delays of the birefringent device are generally constrained such that the phase delays on the return path are opposite those on the forward path. In a fold interleaver, the delays for both the forward and reverse paths are defined by the phase delays associated with the birefringent device through which light travels in two different directions. However, since light does not necessarily have to travel through the common set of birefringent device along precisely the same path in both directions, it may be desirable to insert additional elements into one of the light paths (forward or reverse) and/or otherwise modify the phase delay(s) of one of the paths such that the phase delays along the forward path are not the same of the phase delays along the reverse path.

Varying the phase delay of the birefringent device in the first and/or second stages of an interleaver or the like provides added flexibility in the manner in which approximately zero dispersion may be obtained. This added flexibility may be utilized to provide ease in manufacturing and/or reduced assembly costs.

The different configurations of the present invention, wherein a first stage having three birefringent device cooperates with a second stage (is important to remember that the first and second stages preferably comprise a single birefringent device assembly through which light travels in two different directions) also having three birefringent device so as to facilitate the construction of a device such as optical interleaver which has approximately zero dispersion, are summarized generally in Table I. This table contains those configurations wherein approximately zero dispersion is obtained by varying the orientation of the birefringent elements of the second stage with respect to those of the first stage, varying the phase delays of the birefringent device of the first and/or second stage, and by varying both the orientations of the birefringent devices of the second stage with respect to the first stage and the phase delays of the first and/or second stage.

Phase retardations $\Gamma$ and $\Gamma'$ are a measure of the relative change in phase and are wavelength dependent in general. However, in the close range of the interested wavelengths (1550 nm for example), a small amount of phase change can be considered as wavelength independent. A full wavelength shift in optical path length can be considered as $2\pi$ in phase shift. This assumption give the simplicity to treat the mathematic formulas without introducing unacceptable errors. Considering all parameters used in all tables, it is typical that $2m_1\pi$, $2m_2\pi$, $2m_3\pi$, $2k_1\pi$, $2k_2\pi$, $2k_3\pi$ and $2l$ $\pi<<\Gamma$ and $\Gamma'$.

The fold interleavers of the present invention overcome many of the limitations associated with the optical, physical, mechanical and thermal properties of the birefringent crystal. For example, since a spatial distance determines the amount of birefringence obtained in any element of the birefringent device assembly, variable or tuned birefringence may be obtained by making at least one mirror of a element movable or by facilitating the introduction of different materials, having different indices of refraction, into at least one of the two optical paths of a spatial birefringent device. Thus, tunable fold interleaver can be constructed.

Because of the beam shift in the interleaver of the present invention is symmetric, the polarization mode dispersion (PMD) is minimized.

Thus, the fold interleaver of the present invention provides a low cost and small size. It is worthwhile to note that the folded configuration of the interleaver of the present invention provides automatic match between successive stages of birefringent filtering for effective mitigation of crosstalk and/or dispersion. That is, each pass through the birefringent assembly in a direction opposite to the previous pass therethrough apparently occurs through a birefringent device assembly which is matched to the birefringent device assembly which the light previously pass through since the light passes through the same birefringent device assembly in both instances.

Although specific examples of orientations for the waveplates described herein are given and specific values for the distance between the polarization beam splitter and the mirrors are given, those skilled in the art will appreciate the various other waveplate orientations and distance between polarization beams splitter and mirror can likewise be used. Further, the use of a 50 GHz interleaver by way of example only and not by way of limitation. Those skilled in the art will appreciate that various other channels spacing, particularly smaller channel spacings, may likewise be utilized.

One important aspect of this invention is the ability to control the difference in optical path length between the first and second paths in the spatial birefringent device, so that the birefringence value provided by this difference in optical path length does not vary undesirably during operation of the invention, such as due to temperature changes.

As those skilled in the art will appreciate, the birefringence values of a device determine the operational characteristics, i.e., transmission, dispersion, phase distortion, thereof. Therefore, it is very important that the optical path length differences (and consequently the birefringence values) remain substantially fixed during operation of the devices.

Portions of the first and second paths, other than the portions which contribute the optical path length differences, are less critical since these other portions do not determined birefringence values. Generally, portions of the first and second paths, other than the portions which contribute to the optical path length differences, tend to vary (changes in physical length and/or changes in an index of refraction thereof) in response to environment (e.g., temperature)

changes by approximately the same amount, due to structural similarity and symmetry of the first and second paths, and thus do not generally tend to change the optical path length difference. Therefore, it is that portion of the first and second paths which directly provides the difference in optical path length that must be most carefully controlled.

According to the present invention, the difference in optical path length between the first and second paths in a spatial birefringent device may optionally be controlled by inserting a material having desired optical, thermal and/or mechanical properties into at least the longer of the two paths, so as to substantially fix the optical path length which defines the difference between the first and second paths. Thus, by inserting such a material into at least that portion of one path that defines optical path length difference, substantially more stable operation of the devices is achieved.

Optionally, according to the present invention, those portions of the first and second paths which do not contribute to the optical path length difference comprise air, vacuum or any other material. Of course, these portions of the first and second paths are inherently equal in physical lengths to one another (since they do not contribute to the optical path length difference).

According to the present invention, birefringence is obtained by optical path length differences, which may occur in free space, e.g., air or vacuum. A material of desired optical, thermal, and/or mechanical properties and having a desired index of refraction may be inserted along desired portion of the light paths of the present invention. For example, such a material may be utilized to shorten any desired path lengths and/or to provide a difference in optical path lengths to achieve a birefringent effect. For example, both paths can have the same physical dimensions, and birefringence may be obtained by inserting material having desired optical properties, e.g., an index of refraction greater than one, so as to cause the two paths to have different optical paths lengths. There are many advantages to the present invention as compared to conventional interleavers which utilize birefringent crystals. For example, the difference in optical path length can be manipulated so as to provided desired, comparatively high, birefringence values. An ultra low expansion (ULE) or fused silica may be utilized as a gasket in device construction, so as to obtain excellent temperature stability for the interleaver. Those skilled in the art will appreciate the various other materials having a very low thermal expansion coefficient are likewise suitable for use as such a gasket.

Further, the optical path lengths may be made so as to be variable, thus providing adjustability of the birefringence value and a tunable interleaver. The interleaver of the present invention is simple in construction and low in cost. Thus, the present invention overcomes many of the limitations associated with contemporary birefringent crystal interleavers, such as those limitations associated with the optical, physical, mechanical and thermal properties of birefringent crystals.

It is important to appreciate that, as mentioned above, the phase delay necessary or providing a birefringent effect may be obtained by inserting a material having desired optical, thermal, and/or mechanical properties into at least a portion of either the first or second path in a spatial birefringent device.

Although some examples discussed above utilize equivalent birefringent filter element angles of 45°, −21° and 7° and utilize phase delays of $\Gamma$, $2\Gamma$ and $2\Gamma$, those skilled in the art will appreciate that various other angles and phase delays are likewise suitable. For example, phase delays of $\Gamma$, $2\Gamma$ and $\Gamma$ may alternatively be utilized.

The interleavers described herein are suitable for demultiplexing optical signals. Those skilled in the art will appreciate similar structures may be utilized to multiplex optical signals.

As those skilled in the art will appreciate, the waveplates which are utilized in the present invention can be replaced by other devices. Various devices and/or materials may alternatively be utilized to orient the polarization direction of light beams. For example, devices and/or materials which are responsive to applied voltages, currents, magnetic fields and/or electrical fields may be used to orient the polarization direction of light beams. Thus, the use of waveplates herein is by way of example only, and not by way of limitations.

Further, when waveplates (either half-wave waveplates or quarter-wave waveplates) having identical orientations are dispose next to one another, then a common waveplate may be substituted therefor.

As used herein, the term gasket is defined to include any bracket, mount, optical bench, host, enclosure or any other structure which is used to maintain components of the present invention in desired positions relative to one another. Preferably, such gasket is comprised of an ultra low expansion (ULE) material, fused silica or any other material having a very low thermal expansion coefficient.

It is understood that the exemplary fold interleaver describe herein and shown in the drawings represents only presently preferred embodiments of the invention. Indeed, various other modifications and additions may be made to such embodiments without departing from the spirit of scope of the invention. For example, those skilled in the art will appreciate that various other means for providing spatial birefringents are likewise suitable. Additionally, those skilled in the art will appreciate that various different configurations of the represent invention, using various different paths and various different components for defining such paths are likewise suitable. Thus, this and other modifications and additions may be obvious to those skilled in the art may be implemented to adapt the present invention for use in a variety of different applications.

What is claimed is:

1. An interleaver comprising:
   a birefringent device assembly comprising at least one spatial birefringent device, the birefringent device assembly providing two interim output components;
   a reflector configured to direct the two interim output components from the birefringent device assembly back through the birefringent device assembly;
   wherein the spatial birefringent device consists of:
      a polarization beam splitter to separate an optical beam into two orthogonally polarized components;
      a first polarization rotator and a first reflector to control the propagation of one of the two orthogonally polarized components;
      a second polarization rotator and a second reflector to control the propagation of the other one of the two orthogonally polarized components;
      wherein the first polarization rotator, the first reflector, the second polarization rotator, the second reflector and the polarization beam splitter are configured such that each of the two orthogonally polarized components travels along separate paths of different optical path lengths and when the two orthogonally polarized components recombine at the output of the spatial birefringent device, a phase delay between the two orthogonally polarized components is achieved.

2. The interleaver as recited in claim 1, further comprising a polarization rotator configured to align the two interim output components prior to the two components being transmitted back through the birefringent device assembly such that approximately zero dispersion is obtained in an output of the interleaver.

3. The interleaver as recited in claim 1, wherein the birefringent device assembly comprises a plurality of spatial birefringent devices.

4. The interleaver as recited in claim 1, wherein the birefringent device assembly comprises a first spatial birefringent device having an equivalent angular orientation $\phi_1$, a second spatial birefringent device having an equivalent angular orientation $\phi_2$ and a third spatial birefringent device having an equivalent angular orientation of $\phi_3$;
  wherein an order of the first spatial birefringent device, second spatial birefringent device, and third spatial birefringent device is selected from the group consisting of:
    first spatial birefringent device, second spatial birefringent device, third spatial birefringent device;
    third spatial birefringent device, second spatial birefringent device, first spatial birefringent device; and
    wherein the equivalent angular orientations are with respect to an equivalent polarization direction of light entering the spatial birefringent device.

5. The interleaver as recited in claim 1, wherein the birefringent device assembly comprises:
  a first spatial birefringent device having an equivalent angular orientation of 45° and having a phase delay of $\Gamma$;
  a second spatial birefringent device having an equivalent angular orientation of −21° and having a phase delay of $2\Gamma$; and
  a third spatial birefringent device having an equivalent angular orientation of 7° and having a phase delay of $2\Gamma$.

6. The interleaver as recited in claim 1, wherein the birefringent device assembly comprises two spatial birefringent devices.

7. The interleaver as recited in claim 1, wherein the birefringent device assembly comprises:
  a first spatial birefringent device having an equivalent angular orientation of 45° and having a phase delay of $\Gamma$; and
  a second spatial birefringent device having an equivalent angular orientation of −21° and having a phase delay of $2\Gamma$.

8. The interleaver as recited in claim 1, wherein the birefringent device assembly and the reflector are configured so as to facilitate interleaving of a plurality of input light beams simultaneously.

9. The interleaver as recited in claim 1, wherein two separate light paths are defined for the two orthogonally polarized components, respectively, within the spatial birefringent device, each light path having a different optical path length and wherein a difference in optical path length between the two paths is provided by a material having an index of refraction greater than utility which that is disposed within at least a portion of one of the first and second paths.

10. The interleaver as recited in claim 1, wherein two separate light oaths are defined for the two orthogonally polarized components, respectively, within the spatial birefringent device and wherein an index of refraction is different for at least a portion of at least one of the two light paths so as to cause the two light paths to have different optical path lengths.

11. The interleaver as recited in claim 1, wherein the interleaver channels have spacing which is tunable.

12. A birefringent device assembly comprising:
  at least one spatial birefringent element device; and
  a polarization rotator for controlling an equivalent angle of the birefringent device;
  wherein the spatial birefringent device consists of:
    a polarization beam splitter to separate an optical beam into two orthogonally polarized components;
    a first polarization rotator and a first reflector to control the propagation of one of the two orthogonally polarized components;
    a second polarization rotator and a second reflector to control the propagation of the other one of the two orthogonally polarized components;
    wherein the first polarization rotator, the first reflector, the second polarization rotator, the second reflector, and the polarization beam splitter are configured such that each of the two orthogonally polarized components travels along separate paths of different optical path lengths and when the two orthogonally polarized components recombine at the output of the spatial birefringent device, a phase delay between the two orthogonally polarized components is achieved.

13. A method for interleaving, the method comprising:
  transmitting light through a birefringent device assembly comprised of at least one spatial birefringent device, the birefringent device assembly separating the light into first and second interim output components;
  making the two interim output components polarized along desired polarization directions; and
  transmitting the first and second interim output components back through the birefringent element device assembly;
  wherein the spatial birefringent device consists of:
    a polarization beam splitter to separate an optical beam into two orthogonally polarized components;
    a first polarization rotator and a first reflector to control the propagation of one of the two orthogonally polarized components;
    a second polarization rotator and a second reflector to control the propagation of the other one of the two orthogonally polarized components;
    wherein the first polarization rotator, the first reflector, the second polarization rotator, the second reflector, and the polarization beam splitter are configured such that each of the two orthogonally polarized components travels along separate paths of different optical path lengths and when the two orthogonally polarized components recombine at the output of the spatial birefringent device, a phase delay between the two orthogonally polarized components is achieved.

14. An interleaver comprising:
  a birefringent device assembly comprising at least one spatial birefringent device;
  a reflector configured to direct an interim output of the birefringent device assembly back through the birefringent device assembly;
  wherein the spatial birefringent device consists of:
    a polarization beam splitter to separate an optical beam into two orthogonally polarized components;

a first polarization rotator and a first reflector to control the propagation of one of the two orthogonally polarized components;

a second polarization rotator and a second reflector to control the propagation of the other one of the two orthogonally polarized components;

wherein the first polarization rotator, the first reflector, the second polarization rotator, the second reflector and the polarization beam splitter are configured such that each of the two orthogonally polarized components travels along separate paths of different optical path lengths and when the two orthogonally polarized components recombine at the output of the spatial birefringent device, a phase delay between the two orthogonally polarized components is achieved; and wherein phase delays and orientations of the spatial birefringent devices in the birefringent device assembly are selected from the table:

TABLE I

| First Stage Phase Delays | First Stage Orientations | Second Stage Phase Delays | Second Stage Orientations |
|---|---|---|---|
| $\Gamma + 2m_1 \pi$, $2\Gamma + 2m_2 \pi$, $2\Gamma + 2m_3 \pi$ | $\phi_1, \phi_2, \phi_3$ | $2\Gamma' + 2k_3 \pi$, $2\Gamma' + 2k_2 \pi$, $\Gamma' + 2k_1 \pi$ | $90° \pm \phi_3, 90° \pm \phi_2, 90° \pm \phi_1$ (parallel component) $\pm\phi_3, \pm\phi_2, \pm\phi_1$ (orthogonal component) where $\Gamma - \Gamma' = 2l\pi$ |
| $\Gamma + 2m_1 \pi$, $2\Gamma + 2m_2 \pi$, $2\Gamma + 2m_3 \pi$ | $\phi_1, \phi_2, \phi_3$ | $2\Gamma' + 2k_3 \pi$, $2\Gamma' + 2k_2 \pi$, $\Gamma' + 2k_1 \pi$ | $90° \pm \phi_3, 90° \pm \phi_2, 90° \pm \phi_1$ (parallel component) $\pm\phi_3, \pm\phi_2, \pm\phi_1$ (orthogonal component) where $\Gamma - \Gamma' = (2l + 1)\pi$ |
| $2\Gamma + 2m_3 \pi$, $2\Gamma + 2m_2 \pi$, $\Gamma + 2m_1 \pi$ | $\phi_3, \phi_2, \phi_1$ | $\Gamma' + 2k_1 \pi$, $2\Gamma' + 2k_2 \pi$, $2\Gamma' + 2k_3 \pi$ | $90° \pm \phi_1, 90° \pm \phi_2, 90° \pm \phi_3$ (parallel component) $\pm\phi_1, \pm\phi_2, \pm\phi_3$ (orthogonal component) where $\Gamma - \Gamma' = 2l\pi$ |
| $2\Gamma + 2m_3 \pi$, $2\Gamma + 2m_2 \pi$, $\Gamma + 2m_1 \pi$ | $\phi_3, \phi_2, \phi_1$ | $\Gamma' + 2k_1 \pi$, $2\Gamma' + 2k_2 \pi$, $2\Gamma' + 2k_3 \pi$ | $\pm\phi_1, \pm\phi_2, \pm\phi_3$ (parallel component) $90° \pm \phi_1, 90° \pm \phi_2, 90° \pm \phi_3$ (orthogonal component) where $\Gamma - \Gamma' = (2l + 1)\pi$ |

Wherein $m_1, m_2, m_3, k_1, k_2, k_3$ and l are integers $(0, \pm 1, \pm 2, \ldots)$.

15. An interleaver comprising:

at least one birefringent device assembly, each birefringent device assembly comprising at least one spatial birefringent device; and a reflector configured to direct light, which has passed through each of the birefringent device assemblies sequentially, back through each of the birefringent device assemblies sequentially in a reverse direction;

wherein the spatial birefringent device consists of:

a polarization beam splitter to separate an optical beam into two orthogonally polarized components;

a first polarization rotator and a first reflector to control the propagation of one of the two orthogonally polarized components;

a second polarization rotator and a second reflector to control the propagation of the other one of the two orthogonally polarized components;

wherein the first polarization rotator, the first reflector, the second polarization rotator, the second reflector, and the polarization beam splitter are configured such that each of the two orthogonally polarized components travels along separate paths of different optical path lengths and when the two orthogonally polarized components recombine at the output of the spatial birefringent device, a phase delay between the two orthogonally polarized components is achieved.

* * * * *